US008275780B2

(12) United States Patent
Baba et al.

(10) Patent No.: US 8,275,780 B2
(45) Date of Patent: Sep. 25, 2012

(54) RULE DISCOVERY PROGRAM, RULE DISCOVERY PROCESS, AND RULE DISCOVERY APPARATUS

(75) Inventors: Takayuki Baba, Kawasaki (JP); Susumu Endo, Kawasaki (JP); Shuichi Shiitani, Kawasaki (JP); Yusuke Uehara, Kawasaki (JP); Daiki Masumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1569 days.

(21) Appl. No.: 11/064,952

(22) Filed: Feb. 25, 2005

(65) Prior Publication Data

US 2006/0095411 A1   May 4, 2006

(30) Foreign Application Priority Data

Oct. 29, 2004   (JP) ................................ 2004-317268

(51) Int. Cl.
  *G06F 7/00* (2006.01)
  *G06F 17/30* (2006.01)
(52) U.S. Cl. .................. 707/758; 707/913; 707/915
(58) Field of Classification Search .................. 707/758, 707/913, 915; 382/160
  See application file for complete search history.

(56) References Cited

U.S. PATENT DOCUMENTS

| | | | | |
|---|---|---|---|---|
| 4,538,299 A * | 8/1985 | DeForest | ...................... | 382/197 |
| 4,847,786 A * | 7/1989 | Wang et al. | ................... | 382/171 |
| 5,134,661 A * | 7/1992 | Reinsch | ........................ | 382/100 |
| 5,729,623 A   | 3/1998 | Omatu et al. | | |
| 6,587,577 B1 * | 7/2003 | Finkelstein | .................... | 382/123 |
| 2003/0133515 A1 * | 7/2003 | Kondo | ........................... | 375/295 |
| 2004/0175199 A1 * | 9/2004 | Yoshizawa | ..................... | 399/75 |
| 2006/0181750 A1 * | 8/2006 | Lu et al. | ....................... | 358/527 |

FOREIGN PATENT DOCUMENTS

| | | |
|---|---|---|
| JP | 63-211474 | 9/1988 |
| JP | 1-238652 | 9/1989 |
| JP | 3-252780 | 11/1991 |
| JP | 7-121719 | 5/1995 |

OTHER PUBLICATIONS

Japanese Office Action dated Feb. 17, 2009 in corresponding Application No. 2004-317268.
Patent Abstracts of Japan, Publication No. 07-121719 Published May 12, 1995.
Patent Abstracts of Japan, Publication No. 03-252780 Published Nov. 12, 1991.
Patent Abstracts of Japan, Publication No. 63-211474 Published Sep. 2, 1988.

(Continued)

*Primary Examiner* — Mariela Reyes
(74) *Attorney, Agent, or Firm* — Staas & Halsey LLP

(57) ABSTRACT

A rule discovery program which enables discovery of a rule by automatically searching for a feature portion which is effective for generation of a rule in multimedia data. When sample data items are inputted, a search unit selects evaluation positions on a data array constituting each of the sample data items so as to generate a selection pattern. Next, an integration unit integrates the evaluation positions in the selection pattern so as to generate a predetermined number of evaluation regions, and a rule-candidate generation unit generates a rule candidate indicating a relationship common to the sample data items. A rule-candidate evaluation unit evaluates the generated rule candidate, and an output unit outputs, as a rule, the rule candidate when the rule candidate satisfies a predetermined criterion.

10 Claims, 12 Drawing Sheets

OTHER PUBLICATIONS

Patent Abstracts of Japan, Publication No. 1-238652 Published Sep. 22, 1989.

Shigeru Yamaya, "Data Warehouse Development Keeping the Principle of Hands on Policy", the 9th, Statistical Analysis and Data Mining, Network Computing, Japan, Ric Telephone Corporation, Jan. 1, 1999, vol. 11, No. 1, pp. 64-71.

Junji Nishimura, "New Developments of Next Generation DCS", the 7th, Process Engineering, Automation, Japan, the Nikkan Kogyo Shimbun, Ltd., Aug. 1, 1997, vol. 42, No. 8, pp. 64-67 and cover pages.

Patent Abstracts of Japan, Publication No. 2005-190346 Published Jul. 14, 2005.

Patent Abstracts of Japan, Publication No. 2003-067401, Published Mar. 7, 2003.

Takao Enkawa, "Tahenryo no Data Kaiseki (Multivariate Data Analysis)", published in Japanese by Asakura Shotein, Japan, pp. 22-43.

* cited by examiner

RULE DISCOVERY PROGRAM, RULE DISCOVERY PROCESS, AND RULE DISCOVERY APPARATUS

CROSS-REFERENCE TO RELATED APPLICATIONS

This application is based upon and claims the benefits of priority from the prior Japanese Patent Application No. 2004-317268, filed on Oct. 29, 2004, the entire contents of which are incorporated herein by reference.

BACKGROUND OF THE INVENTION (1) Field of the Invention

The present invention relates to a rule discovery program, a rule discovery process, and a rule discovery apparatus for discovering a relationship between a plurality of information items, and in particular a relationship between multimedia data items and text data items respectively associated with the multimedia data items.

(2) Description of the Related Art

Currently, situation analysis based on multimedia data is being used in various fields. For example, it is possible to determine whether an image of a component (part) used in manufacture is satisfactory or unsatisfactory by taking and analyzing an image of the component. Various types of estimation of situation (e.g., diagnosis of diseases) based on multimedia data such as the above image are currently being used in a wide range of fields including analysis of static or moving images, analysis of volume data, analysis of time-series information, fluid analysis, performance analysis of mechanical components, diagnosis of medical images, clarification of brain functions, market analysis, and the like.

In the case where situation analysis is performed based on multimedia data, the efficiency in analysis of the multimedia data can be improved when a relationship between a property of an object represented by the multimedia data and information represented by the multimedia data is indicated by a rule (scientific rule). For example, in the case where a photographic image of a component exists, and a region of the photographic image to which attention should be paid is known when determination whether the component is satisfactory or unsatisfactory is made, the determination can be easily made based on the photographic image.

Therefore, a device (e.g., an image mining device) which supports discovery of knowledge about the relationship between the multimedia data and the text data representing the property of the object is necessary. In this case, it is necessary to determine a portion of the multimedia data having a strong correlation with the text data (which indicates, for example, whether or not the component is satisfactory or unsatisfactory).

At this time it is possible to determine a feature portion of the multimedia data to be the above portion having a strong correlation with the text data. A number of methods are known for extracting a predetermined feature (e.g., an image feature in the case where the multimedia data represents an image) from multimedia data. Since there are myriad of image features including relatively general features such as colors and features specific to individual fields such as shapes of some portions of images, it is difficult to designate in advance an appropriate image feature (which has a strong correlation with the text data).

In consideration of the above circumstances, a method is proposed for supporting an operation of extracting an image feature based on an operator's visual observation in processing for discovering knowledge (rule) about a relationship between an image feature and a text feature from a plurality of pairs of image data items and character data items (text data items) associated with the image data items. At this time, it is possible to set an association rule indicating a relationship between images and texts (i.e., a rule indicating the strength of association between events), and display an evaluation result of the association rule (as disclosed in, for example, Japanese Unexamined Patent Publication No. 2003-67401).

However, according to the technique disclosed in Japanese Unexamined Patent Publication No. 2003-67401, the features of images are humanly determined, and therefore the following problems occur.

(a) The labor cost increases.

(b) The discovered rule can depend on a personal point of view.

(c) Rules which are difficult to discover can be overlooked.

In order to solve the above problems, Japanese Patent Application No. 2003-433233, filed by the assignee of the present patent application discloses a technique. According to this technique, wavelet transformation is performed on an image, and coefficients based on which a feature of text data can be determined are extracted from among the coefficients generated by the wavelet transformation.

Nevertheless, in the above technique disclosed in Japanese Patent Application No. 2003-433233, only a relationship between each coefficient and the text data is obtained by analysis. Therefore, even when there is a strong correlation among the text data and portions of data located in a plurality of discrete positions in the image, it is impossible to extract a rule which indicates the correlation. For example, in some cases, even when there is no correlation either between the text data and a portion of data in a region A or between the text data and a portion of data in a region B, a strong correlation can exist between the text data and a sum of the portions of data in the regions A and B.

In addition, generally, each multimedia data item is constituted by a plurality of data elements (for example, the brightness of each pixel of an image). Therefore, if each data element is treated as an individual variable, the number of possible combinations of the variables becomes extremely great. However, it is difficult to accurately obtain a relationship among text data and the extremely great number of possible combinations of the variables on a real-time basis by making a thorough investigation of the extremely great number of possible combinations of the variables.

SUMMARY OF THE INVENTION

The present invention is made in view of the above problems, and the object of the present invention is to provide a rule discovery program, a rule discovery process, and a rule discovery apparatus which enables discovery of a rule indicating a relationship between multimedia data items and text data items by automatically searching for feature portions of multimedia data, which are effective for generation of the rule.

In order to accomplish the above object, a rule discovery program for discovering a rule indicating a relationship between multimedia data items and text data items respectively associated with the multimedia data items is provided. The rule discovery program makes a computer comprise: an input reception unit which receives sample data items which are respectively constituted by pairs formed of the multimedia data items and the text data items; a search unit which performs operations of selecting evaluation positions of a data array, and generating a selection pattern indicating the evaluation positions, where the data array constitutes each of the multimedia data items in the sample data items, and the evaluation positions are positions at which evaluation is to be made; an integration unit which performs an operation of integrating the evaluation positions of the data array which are selected by the search unit, so as to generate one or more evaluation regions which are to be evaluated; a rule-candidate generation unit which performs an operation of generating feature data of the one or more evaluation regions in each of the multimedia data items by representing data in the one or more evaluation regions by one or more numerical values, and a rule candidate which indicates a relationship between the feature data of the one or more evaluation regions in each of the multimedia data items and one of the text data items associated with the multimedia data item, where the relationship indicated by the rule candidate is common to all of the multimedia data items; a rule-candidate evaluation unit which performs an operation of evaluating accuracy of the relationship indicated by the rule candidate generated by the rule-candidate generation unit so as to obtain an evaluation result; and an output unit which performs an operation of outputting as a rule the rule candidate generated by the rule-candidate generation unit when the evaluation result satisfies a predetermined criterion. The operations of the search unit, the integration unit, the rule-candidate generation unit, the rule-candidate evaluation unit, and the output unit are repeated with a different combination of evaluation positions of the data array until a predetermined condition for completion of the search operation is satisfied.

In addition, in order to accomplish the aforementioned object, a rule discovery process for discovering, by using a computer, a rule indicating a relationship between multimedia data items and text data items respectively associated with the multimedia data items is provided. The rule discovery process comprises the steps of: (a) receiving, by an input reception unit, sample data items which are respectively constituted by pairs formed of the multimedia data items and the text data items; (b) selecting, by a search unit, evaluation positions of a data array, and generating a selection pattern indicating the evaluation positions, where the data array constitutes each of the multimedia data items in the sample data items, and the evaluation positions are positions at which evaluation is to be made; (c) integrating, by an integration unit, the evaluation positions of the data array which are selected in the step (b), so as to generate one or more evaluation regions which are to be evaluated; (d) generating, by a rule-candidate generation unit, feature data of the one or more evaluation regions in each of the multimedia data items by representing data in the one or more evaluation regions by one or more numerical values, and a rule candidate which indicates a relationship between the feature data of the one or more evaluation regions in each of the multimedia data items and one of the text data items associated with the multimedia data item, where the relationship indicated by the rule candidate is common to all of the multimedia data items; (e) evaluating, by a rule-candidate evaluation unit, accuracy of the relationship indicated by the rule candidate generated in the step (d) so as to obtain an evaluation result; and (f) outputting, by an output unit, as a rule the rule candidate generated in the step (d) when the evaluation result satisfies a predetermined criterion. The operations in the steps (b) to (f) are repeated with a different combination of evaluation positions of the data array until a predetermined condition for completion of the search operation is satisfied.

Further, in order to accomplish the aforementioned object, a rule discovery apparatus for discovering a rule indicating a relationship between multimedia data items and text data items respectively associated with the multimedia data items is provided. The rule discovery apparatus comprises: an input reception unit which receives sample data items which are respectively constituted by pairs formed of the multimedia data items and the text data items; a search unit which performs operations of selecting evaluation positions of a data array, and generating a selection pattern indicating the evaluation positions, where the data array constitutes each of the multimedia data items in the sample data items, and the evaluation positions are positions at which evaluation is to be made; an integration unit which performs an operation of integrating the evaluation positions of the data array which are selected by the search unit, so as to generate one or more evaluation regions which are to be evaluated; a rule-candidate generation unit which performs an operation of generating feature data of the one or more evaluation regions in each of the multimedia data items by representing data in the one or more evaluation regions by one or more numerical values, and a rule candidate which indicates a relationship between the feature data of the one or more evaluation regions in each of the multimedia data items and one of the text data items associated with the multimedia data item, where the relationship indicated by the rule candidate is common to all of the multimedia data items; a rule-candidate evaluation unit which performs an operation of evaluating accuracy of the relationship indicated by the rule candidate generated by the rule-candidate generation unit so as to obtain an evaluation result; and an output unit which performs an operation of outputting as a rule the rule candidate generated by the rule-candidate generation unit when the evaluation result satisfies a predetermined criterion. The operations of the search unit, the integration unit, the rule-candidate generation unit, the rule-candidate evaluation unit, and the output unit are repeated with a different combination of evaluation positions of the data array until a predetermined condition for completion of the search operation is satisfied.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Figure 1:
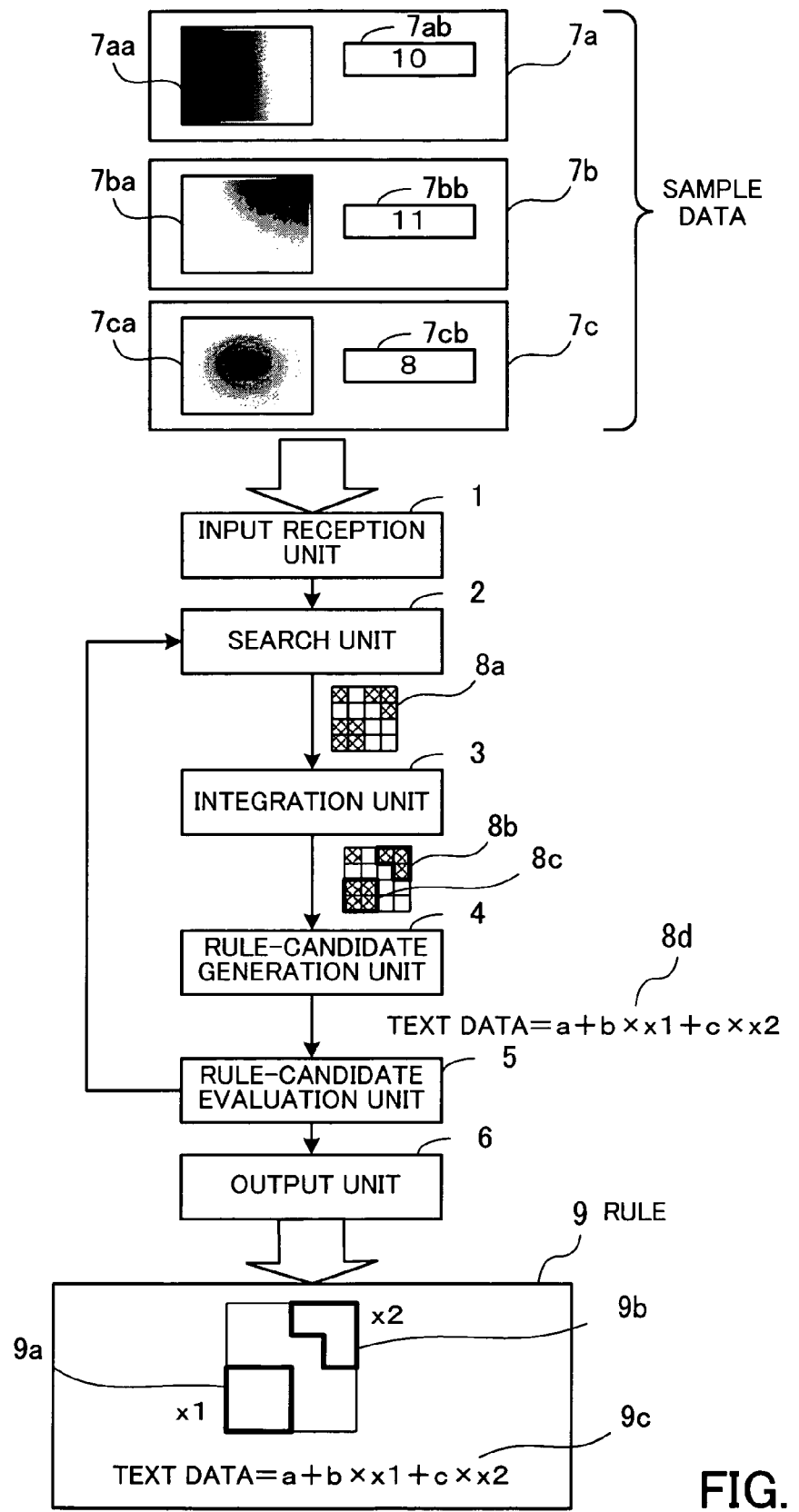
FIG. 1 is a conceptual diagram illustrating the present invention, which is realized in embodiments.

Preferred embodiments of the present invention will be described below with reference to the accompanying drawings, wherein like reference numerals refer to like elements throughout.

First, an outline of the present invention which is realized in the embodiments is explained, and thereafter details of the embodiments are explained.

FIG. 1 is a conceptual diagram illustrating the operations of the present invention, which is realized in the embodiments. As illustrated in FIG. 1, the rule discovery program or the rule discovery apparatus according to the present invention comprises an input reception unit 1, a search unit 2, an integration unit 3, a rule-candidate generation unit 4, a rule-candidate evaluation unit 5, and an output unit 6.

The input reception unit 1 receives input of a plurality of sample data items 7a, 7b, and 7c, which are respectively constituted by pairs of multimedia data items 7aa, 7ba and 7ca and text data items 7ab, 7bb and 7cb.

The search unit 2 selects evaluation positions (i.e., positions at which evaluation is to be made) of a data array, and generates a selection pattern 8a indicating the selected evaluation positions, where the data array constitutes each of the multimedia data items 7aa, 7ba and 7ca in the plurality of sample data items 7a, 7b, and 7c. For example, in the case where the multimedia data items 7aa, 7ba and 7ca are image data items, the evaluation positions of the data array are pixel positions, and represented by x- and y-coordinates.

In addition, the search unit 2 changes (the combination of) the evaluation positions of the data array, and repeats the processing for generating a selection pattern 8a, until a predetermined condition for completion of the search operation is satisfied. For example, the search unit 2 repeats the processing for generating a selection pattern 8a, until the number of the generated selection patterns exceeds a predetermined number.

The integration unit 3 integrates the evaluation positions of the data array in each selection pattern 8a so as to generate one or more (or a predetermined number) of evaluation regions 8b and 8c, as regions of which the evaluation is to be performed. For example, the integration unit 3 integrates adjacent ones of the evaluation positions of the data array. The predetermined number is, for example, two.

The rule-candidate generation unit 4 generates feature data of the one or more evaluation regions 8b and 8c in each of the multimedia data items 7aa, 7ba and 7ca by representing the data in the one or more evaluation regions by one or more numerical values, and a rule candidate 8d which indicates a relationship between the feature data of the one or more evaluation regions 8b and 8c in each multimedia data item and one of the text data items 7ab, 7bb and 7cb associated with the multimedia data item, where the relationship is common to all of the multimedia data items 7aa, 7ba and 7ca. For example, the feature data of each of the one or more evaluation regions 8b and 8c is an average value of the data in the evaluation region, and the rule candidate 8d can be obtained by multiple regression analysis. According to the multiple regression analysis, a relationship among a plurality of variables X1, X2, ..., Xn called explanatory variables and another variable Y called an objective variable is expressed by a formula, and analysis is made for determining the degree of influence of the variations in the explanatory variables on the variations in the objective variable.

The rule-candidate evaluation unit 5 evaluates the accuracy of the relationship which is indicated by the rule candidate 8d generated by the rule-candidate generation unit 4. For example, when the rule candidate 8d is obtained by multiple regression analysis, it is possible to evaluate the rule candidate 8d based on the value of the multiple correlation coefficient of a prediction formula indicated by the rule candidate 8d.

When the result of the evaluation obtained by the rule-candidate evaluation unit 5 shows that the rule candidate satisfies a predetermined criterion, the output unit 6 outputs the rule candidate as a rule 9. For example, the rule 9 contains evaluation-region information items 9a and 9b respectively indicating the evaluation regions 8b and 8c which are used for generation of the rule 9, and a prediction formula 9c indicating a relationship among the feature data of the evaluation regions 8b and 8c in each of the multimedia data items 7aa, 7ba and 7ca and the one of the text data items 7ab, 7bb and 7cb in the multimedia data item.

The construction having the above functions operates as follows.

When the input reception unit 1 receives a plurality of text data items 7ab, 7bb and 7cb, the search unit 2 selects evaluation positions (i.e., positions at which evaluation is to be made) of a data array, and generates a selection pattern 8a indicating the selected evaluation positions, where the data array constitutes each of the multimedia data items 7aa, 7ba and 7ca in the plurality of sample data items 7a, 7b, and 7c. The search unit 2 repeats the processing for generating a selection pattern 8a until the predetermined condition for completion of the search operation is satisfied.

Next, the integration unit 3 integrates the evaluation positions of the data array in each selection pattern 8a so as to generate the predetermined number (one or more) of evaluation regions 8b and 8c, as regions of which the evaluation is to be performed.

Then, the rule-candidate generation unit 4 generates feature, data of each of the one or more evaluation regions 8b and 8c in each of the multimedia data items 7aa, 7ba and 7ca by representing the data in the one or more evaluation regions by one or more numerical values, and a rule candidate 8d which indicates a relationship between the feature data of the one or more evaluation regions 8b and 8c in each multimedia data item and one of the text data items 7ab, 7bb and 7cb associated with the multimedia data item, where the relationship is common to all of the multimedia data items 7aa, 7ba and 7ca.

Subsequently, the rule-candidate evaluation unit 5 evaluates the accuracy of the relationship which is indicated by the rule candidate 8d generated by the rule-candidate generation unit 4. In the case where the result of the evaluation obtained by the rule-candidate evaluation unit 5 shows that the rule candidate satisfies the predetermined criterion, the output unit 6 outputs the rule candidate as a rule 9.

As described above, it is possible to automatically extract a rule 9 from the sample data items 7a, 7b, and 7c. Since the integration unit 3 integrates the evaluation positions, it is possible to effectively generate a rule candidate even when the number of data elements constituting the original multimedia data is great.

In addition, since the rule 9 can be automatically extracted from the sample data items 7a, 7b, and 7c, the labor cost can be reduced. Further, since a relationship among text data and a plurality of regions in multimedia data can be obtained, it is possible to increase the possibility of extraction of a feature of the multimedia data which is not humanly easy to discover. Furthermore, since the rule candidates are evaluated in accordance with a predetermined procedure, rules can be determined in an objective manner.

Hereinbelow, the embodiment of the present invention are explained by using examples in which the multimedia data are image data.

First Embodiment

In the first embodiment, the present invention is used in a designing stage of an industrial product. Specifically, the present invention is applied to analysis for obtaining a relationship between the strength of a chassis of a personal computer (hereinafter referred to as a PC chassis) and a temperature distribution in a material poured in a mold.

Figure 2:
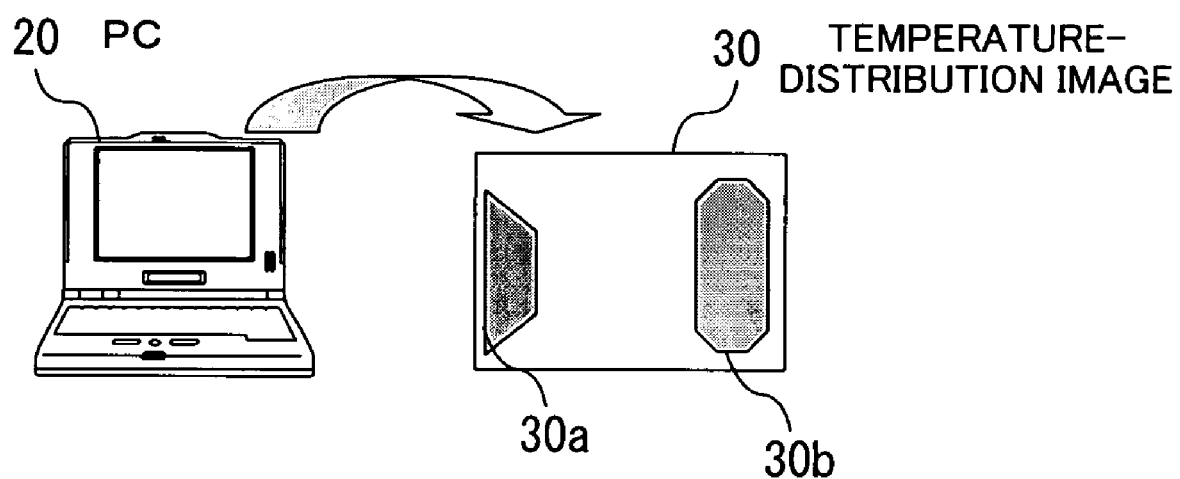
FIG. 2 is a diagram illustrating a temperature-distribution image corresponding to the shape of a PC chassis.

FIG. 2 is a diagram illustrating a temperature-distribution image corresponding to the shape of a PC chassis.

When a mold for a chassis of a personal computer 20 is designed, it is necessary to consider the strength of the chassis. The strength of the chassis is influenced by a temperature distribution in a material poured in the mold for the chassis. Therefore, it is required to discover a rule for a temperature distribution which realizes high strength of the chassis. At this time, a temperature-distribution image 30 indicating a temperature distribution in a material poured in a mold is calculated by using a simulator.

The temperature-distribution image 30 represents the temperature at each position of the material poured in the mold, for example, by the hue (or brightness). At this time, it is necessary to discover regions 30a and 30b which influence the strength of the chassis, from the temperature-distribution image 30. For example, in the case where a rule that the strength of the chassis is enhanced when the temperature of the region 30a is high and the temperature of the region 30b is low, it is desirable to design the shape of the chassis so as to realize such a temperature distribution in the material poured in the mold.

Figure 3:
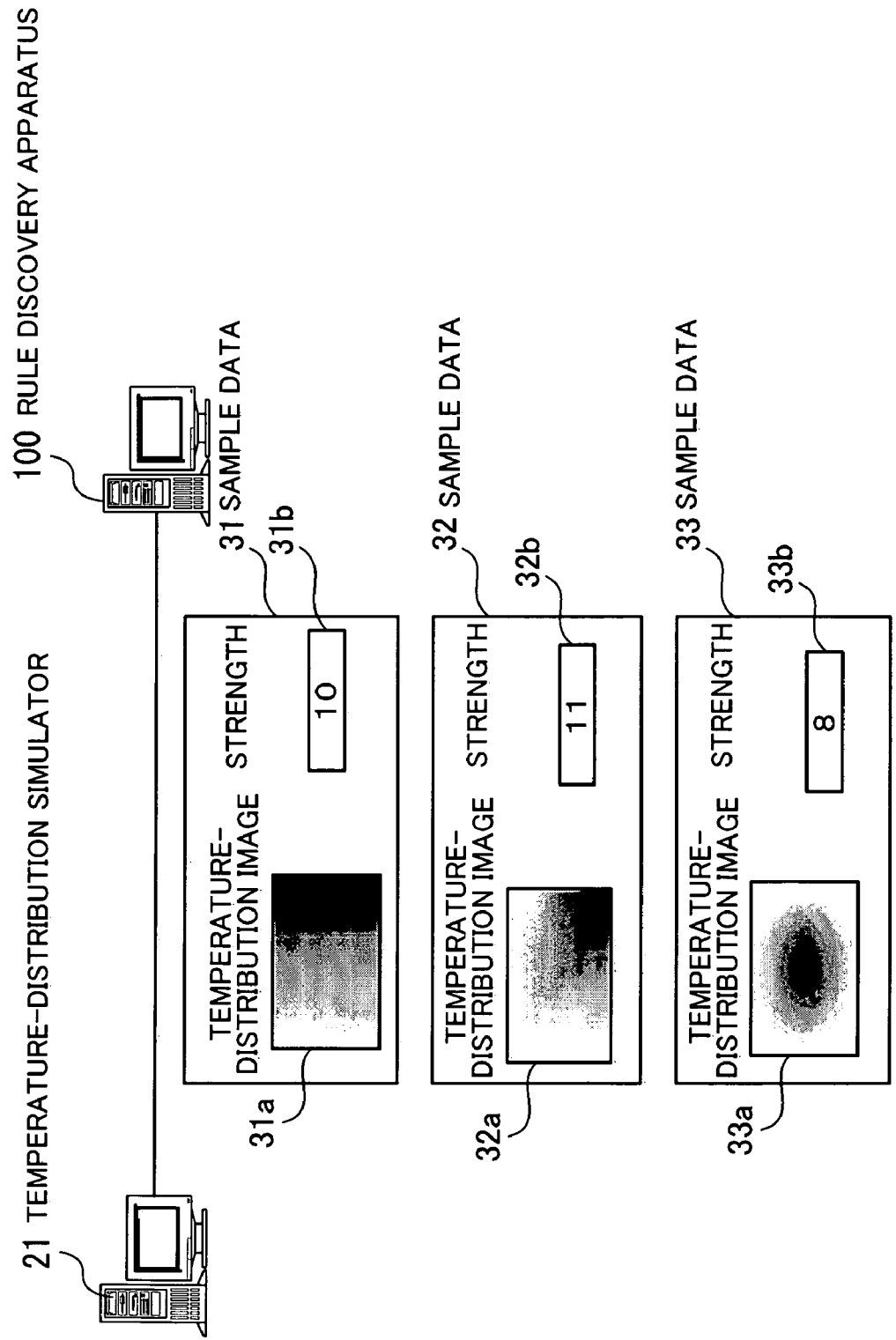
FIG. 3 is a diagram illustrating a configuration of a system in which the embodiments of the present invention are used.

FIG. 3 is a diagram illustrating a configuration of a system in which the embodiments of the present invention are used. As illustrated in FIG. 3, a temperature-distribution simulator 21 and a rule discovery apparatus 100 are connected. The temperature-distribution simulator 21 can calculate a temperature distribution in a material pored in a mold for a chassis, based on the shape of the chassis. In addition, the temperature-distribution simulator 21 generates temperature-distribution images 31a, 32a, and 33a, each of which represents the temperature at each position of the material poured in a mold, for example, by the hue or brightness. For example, each of the temperature-distribution images 31a, 32a, and 33a can represent regions corresponding to higher temperature values by colors more close to red, and regions corresponding to lower temperature values by colors more close to blue.

The rule discovery apparatus 100 generates a prediction formula indicating a cause-effect relationship existing among the temperature-distribution images 31a, 32a and 33a and chassis-strength values 31b, 32b and 33b, based on a plurality of sample data items 31, 32, and 33 constituted by the temperature-distribution images 31a, 32a and 33a and the chassis-strength values 31b, 32b and 33b, where the temperature-distribution images 31a, 32a and 33a are generated according to data representing the shapes of the molds, and the chassis-strength values 31b, 32b and 33b indicate values of the strength of the chassis produced from the molds.

The designer of the chassis can obtain a rule for determination of the performance of the designed chassis by using the above system. For this purpose, first, the designer prepares model data representing samples of chassis having various shapes, and then inputs the model data into the temperature-distribution simulator 21.

The temperature-distribution simulator 21 calculates temperature distributions in the material poured into the molds for the above chassis based on the above model data, generates the temperature-distribution images 31a, 32a, and 33a, and inputs the temperature-distribution images 31a, 32a, and 33a into the rule discovery apparatus 100.

In addition, the designer obtains the values 31b, 32b and 33b of the strength of the designed chassis (the chassis-strength values) by measurement, and inputs the values 31b, 32b and 33b into the rule discovery apparatus 100. The rule discovery apparatus 100 holds the pairs of the temperature-distribution images 31a, 32a and 33a and the chassis-strength values 31b, 32b and 33b as sample data items 31, 32, and 33, and generates a rule based on the sample data items 31, 32, and 33.

Figure 4:
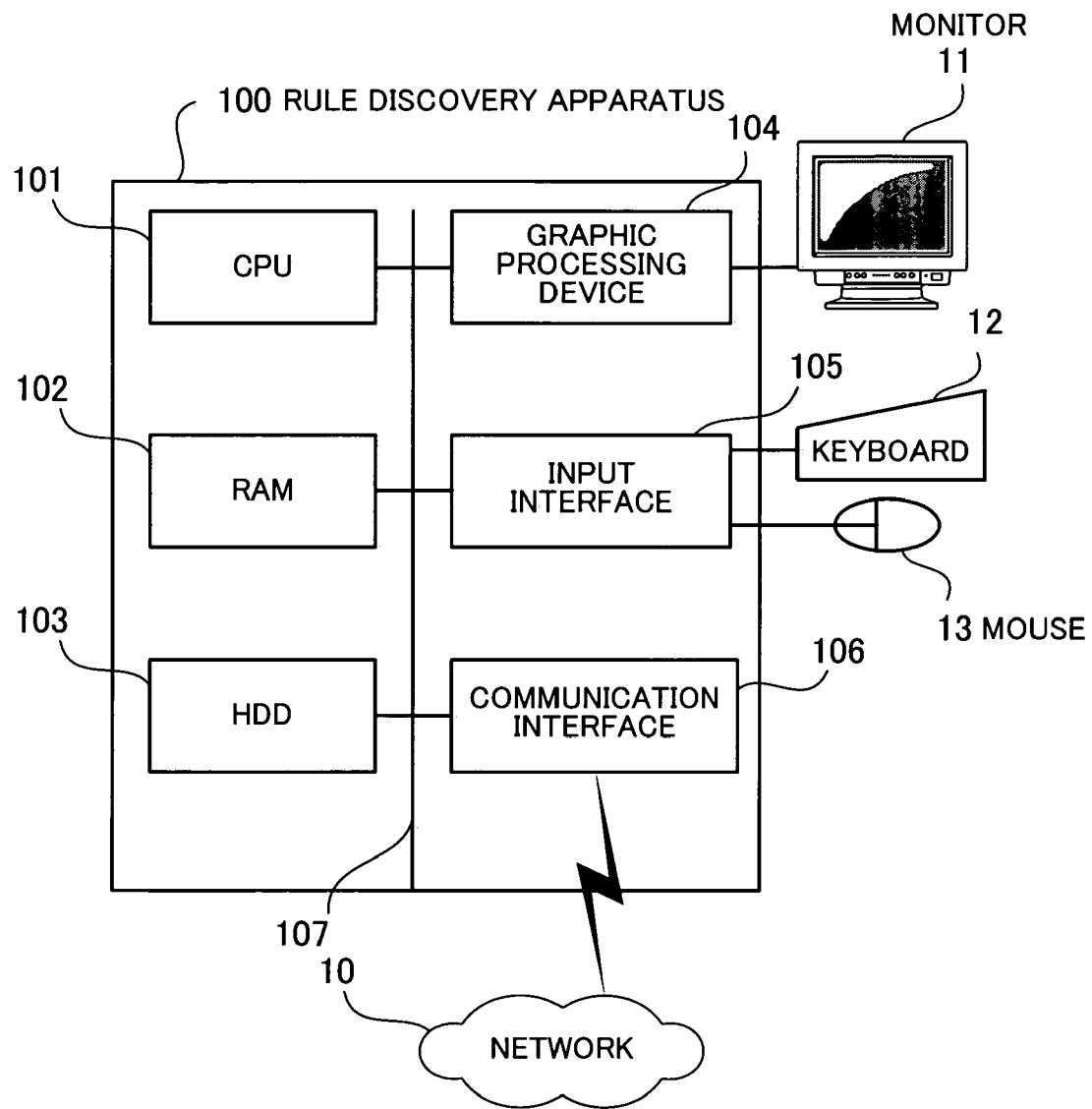
FIG. 4 is a diagram illustrating a hardware construction of a rule discovery apparatus used in the embodiments.

FIG. 4 is a diagram illustrating a hardware construction of the rule discovery apparatus 100 used in the embodiments. The entire rule discovery apparatus 100 is controlled by a CPU (central processing unit) 101, to which a RAM (random access memory) 102, an HDD (hard disk drive) 103, a graphic processing device 104, an input interface 105, and a communication interface 106 are connected through a bus 107.

The RAM 102 temporarily stores at least portions of an OS (operating system) program and application programs which are executed by the CPU 101, as well as various types of data necessary for processing by the CPU 101. The HDD 103 stores the OS and application programs.

A monitor 11 is connected to the graphic processing device 104, which makes the monitor 11 display an image on a screen in accordance with an instruction from the CPU 101. A keyboard 12 and a mouse 13 are connected to the input interface 105, which transmits signals sent from the keyboard 12 and the mouse 13, to the CPU 101 through the bus 107.

The communication interface 106 is connected to a network 10, and exchanges data with other computers through the network 10.

By using the above hardware construction, it is possible to realize the functions of the rule discovery apparatus 100 according to the present invention. In addition, the temperature-distribution simulator 21 can also be realized by using a similar hardware construction.

Hereinbelow, a manner of generation of a rule by the rule discovery apparatus 100 is explained in detail.

Figure 5:
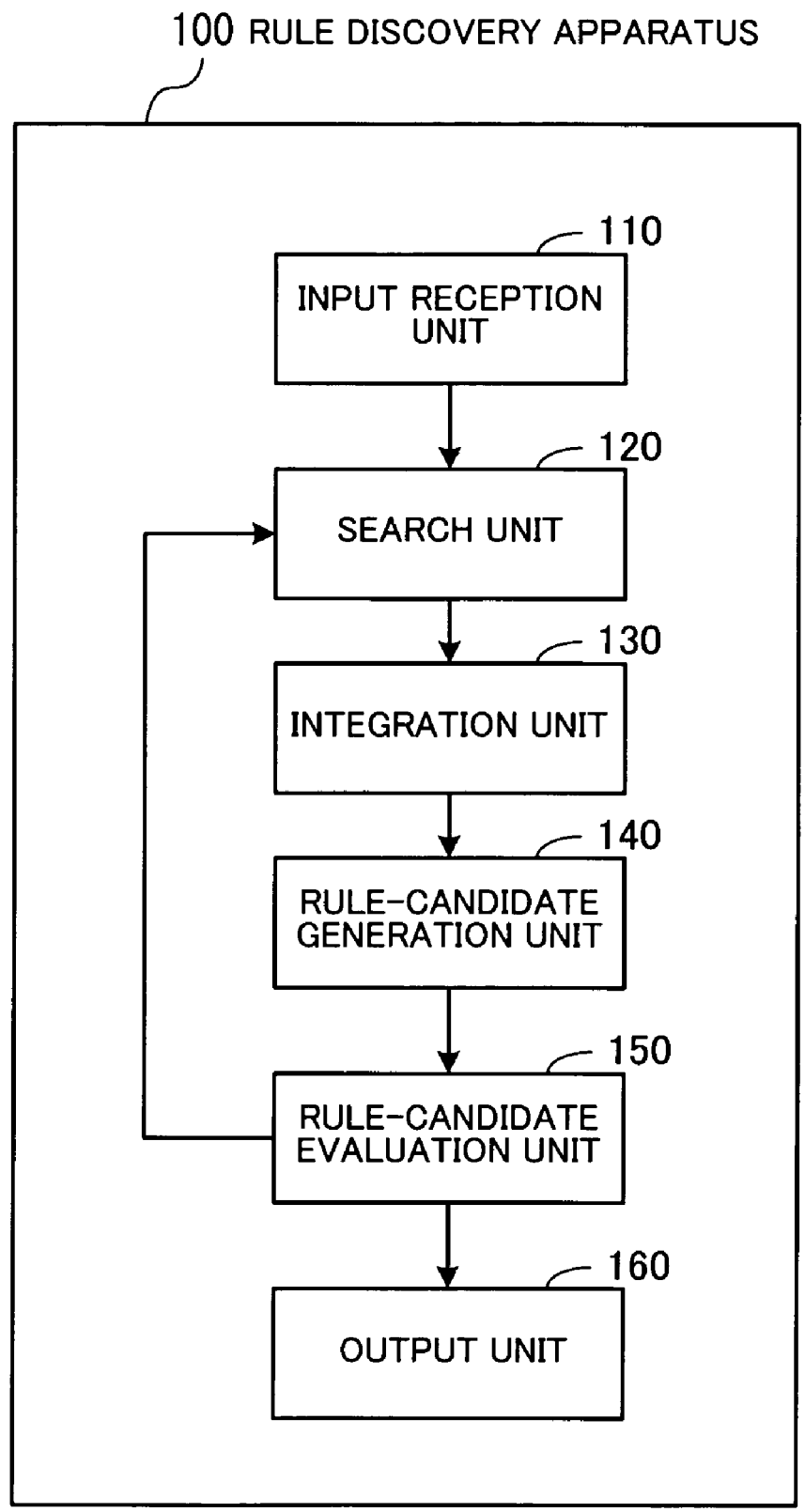
FIG. 5 is a block diagram illustrating the functions of a rule discovery apparatus.

FIG. 5 is a block diagram illustrating the functions of the rule discovery apparatus. As illustrated in FIG. 5, the rule discovery apparatus 100 comprises an input reception unit 110, a search unit 120, an integration unit 130, a rule-candidate generation unit 140, a rule-candidate evaluation unit 150, and an output unit 160.

The input reception unit 110 receives input of a plurality of sample data items, which are respectively constituted by pairs of temperature-distribution images and chassis-strength values, where the temperature-distribution images represent temperature distributions in respective chassis, and are supplied from the temperature-distribution simulator 21. Then, the input reception unit 110 passes all or a portion of the received sample data items to the search unit 120 as input data. In addition, the input reception unit 110 can pass a selected portion of the temperature-distribution images to the search unit 120.

Further, the input reception unit 110 has an interface through which a limiting condition such as advance knowledge of the designer can be received, where the limiting condition may be supplied to the rule discovery apparatus 100 by manual input. For example, the input reception unit 110 can receive manipulation input of an upper limit of the number of variables used in a rule (such as a prediction formula in multiple regression analysis), as explained later. The advance knowledge as above is set by the designer according to a problem to be solved.

The search unit 120 selects, as evaluation positions, positions of more than one pixel used in generation of a rule candidate, from among the positions of the pixels constituting each temperature distribution image, and generates, as a selection pattern, information indicating the combination of the evaluation positions. The search unit 120 repeats the processing for generating a selection pattern until a predetermined condition for completion of the search operation is satisfied.

For example, the search unit 120 completes the processing for generating a selection pattern when a search of all possible combinations is completed, or when the number of repetitions reaches a predetermined upper limit. Alternatively, it is possible to complete the processing for generating a selection pattern when a rule candidate is evaluated by the rule-candidate evaluation unit 150 to satisfy a predetermined criterion.

If all possible combinations of pixels are calculated, the number of the selection patterns becomes $2^N$ (where N is the number of pixels), and the search space becomes extremely great. Since the processing time increases with the search space, the search of all pixels is not practicable. Therefore, the condition for completion of the search operation is predetermined.

In order to reduce the processing time, it is possible to consider an approximate search instead of the exhaustive search (the search of all possible combinations). A concrete example of the approximate search is the genetic algorithm (GA). Alternatively, it is possible to use the greedy algorithm, a neural network, or the like for searching for combinations. In this embodiment, combinations of pixels are searched for by using a GA. The GA processing performed in this embodiment is explained in detail later.

The integration unit 130 integrates ones of the evaluation positions selected by the search unit 120 so as to generate evaluation regions, by selecting a plurality of pixels in the selection pattern generated by the search unit 120, and representing the values of the selected pixels by values of predetermined variables in accordance with a predetermined procedure, where the pixel is the minimum image element constituting each image.

The rule-candidate generation unit 140 generates a rule candidate which describes a relationship between each multimedia data item (temperature-distribution image) and the corresponding text data item (chassis-strength value) by using the values of the predetermined variables obtained by the integration unit 130. Specifically, the rule-candidate generation unit 140 calculates an average of the values of the pixels corresponding to each of the evaluation regions obtained by the integration in each of the temperature-distribution images, and generates a prediction formula by multiple regression analysis, where the prediction formula constitutes the rule candidate.

The value of each pixel is a numerical value indicating the brightness of the pixel in the case where the temperature is indicated by the brightness in each temperature-distribution image, or the hue of the pixel in the case where the temperature is indicated by the hue in each temperature-distribution image. In the latter case, for example, more reddish pixels indicate higher temperature values, more bluish pixels indicate lower temperature values, and greater numerical values indicate higher temperature values. The temperature values can be obtained from the hue values by the inverse calculation to a calculation by which the hue values are obtained from the temperature values for generation of the temperature-distribution images.

The rule-candidate evaluation unit 150 evaluates the rule candidate obtained by the rule-candidate generation unit 140, based on information associated with the rule candidate. Specifically, when the rule candidate is obtained by the multiple regression analysis, the rule-candidate evaluation unit 150 evaluates the rule candidate based on the multiple correlation coefficient The multiple correlation coefficient can take a value in the range from −1 to 1, and have an absolute value nearer to 1 when the error in the prediction formulas is smaller. Therefore, the rule-candidate evaluation unit 150 uses the value of the multiple correlation coefficient as an evaluation value based on which the rule-candidate evaluation unit 150 determines whether or not the rule candidate is to be extracted as a rule. For example, the rule-candidate evaluation unit 150 extracts a rule candidate as a rule when the absolute value of the multiple correlation coefficient is equal to or greater than a predetermined threshold value (e.g., 0.5). In addition, since the correlation coefficients between the explanatory variables are also essential in the case where the multiple regression analysis is used, it is possible to use the correlation coefficients between the explanatory variables as portions of evaluation items.

When the evaluation value of a rule candidate is calculated, and determined to be equal to or greater than the predetermined threshold value, the output unit 160 outputs the rule candidate as a rule. The output unit 160 can output more than one rule. For example, in the case of the multiple regression analysis, a prediction formula, a multiple correlation coefficient, information indicating selection of pixels corresponding to the explanatory variables, and the like constitute a rule. The information indicating selection of pixels corresponding to the explanatory variables can be clarified by visualization (graphic display). The rule obtained above is considered by the designer to be reflected in the design of the product.

Next, the genetic algorithm (GA) is explained in detail below.

In implementation of a GA, each combination of selected pixels is deemed to be an individual In the first generation, a predetermined number (e.g., 32) of individuals in which different combinations of pixels are selected are prepared. The output unit 160 repeats operations of alteration (such as crossover and mutation), of genes in generated individuals over several generations, and searches for at least one combination of pixels which has a high evaluation value. In the case of the approximate search, each combination obtained as above is not an optimum solution, but a locally optimum solution.

Figure 6:
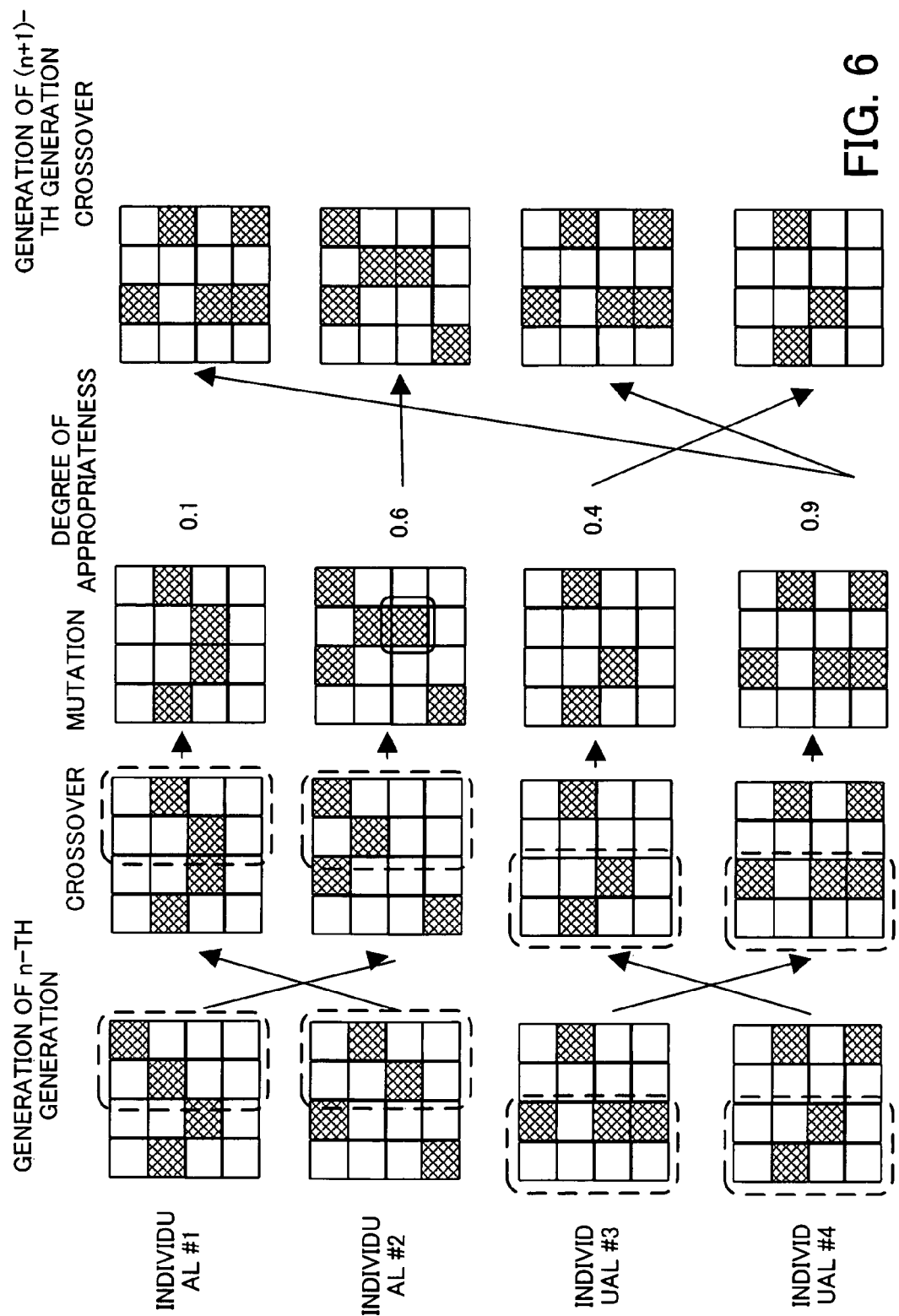
FIG. 6 is a diagram illustrating a method for alternating generations in selection of pixels by using a genetic algorithm.

FIG. 6 is a diagram illustrating a method for alternating generations in selection of pixels by use of a GA. For simplicity of explanation, in the example of FIG. 6, it is assumed that selection is made from 4×4 pixels, and the number of individuals is four. Information indicating whether or not each pixel is selected is assigned to the pixel as a gene. In FIG. 6, selected pixels are indicated by crosshatched squares, and nonselected pixels are indicated by blank squares.

Consider generation of individuals in the n-th generation, where n is a natural number.

In this case, first, the search unit 120 determines initial genes (combinations of selected pixels) from which the individuals in the n-th generation are to be generated. For example, the search unit 120 chooses a predetermined number of individuals from individuals in the (n−1)-th generations with the probability corresponding to the degree of appropriateness of each individual. At this time, it is assumed that an identical individual may be chosen more than once, and the genes of each of the chosen individuals are determined to be the initial genes for the individuals in the n-th generation.

Next, the search unit 120 performs a crossover operation on the individuals for which the initial genes are determined. Specifically, the search unit 120 chooses pairs of individuals from the set of the individuals, determines regions (sets of pixels) in which genes are to be exchanged, in each of the above pairs, and exchanges genes of pixels in the corresponding positions in the individuals forming the pair, where each gene indicates whether or not the corresponding pixel is selected.

For example, in the example of FIG. 6, a pair is formed of the individuals #1 and #2, and another pair is formed of the individuals #3 and #4. In FIG. 6, the right halves of the individuals #1 and #2, and the left halves of the individuals #3 and #4 are respectively regions (sets of pixels) in which genes are to be exchanged. Thus, the genes of the corresponding pixels in the right halves of the individuals #1 and #2 are exchanged, and the genes of the corresponding pixels in the left halves of the individuals #3 and #4 are exchanged. Alternatively, the regions in which genes are to be exchanged may be determined in other manners.

Subsequently, the search unit 120 performs an operation for mutation. In the operation for mutation, the search unit 120 chooses; pixels with a random probability (e.g., 0.01), exchanges the genes (selection or nonselection) of the chosen pixels, and then calculates the degree of appropriateness of each individual. The multiple correlation coefficient obtained by the multiple regression analysis of the state of selection of pixels in each individual is used as the degree of appropriateness.

In order to generate individuals in the (n+1)-th generation, individuals having higher degrees of appropriateness in the n-th generation are chosen for the next generation with higher probabilities. In the above example, the degrees of appropriateness of the individuals #1, #2, #3, and #4 are 0.1, 0.6, 0.4, and 0.9, respectively. Therefore, the probabilities that the individuals #1, #2, #3, and #4 are chosen for the next generation are 5%, 30%, 20%, and 45%, respectively. In the example illustrated in FIG. 6, the individuals #4, #2, #4, and #3 are chosen.

Thereafter, similar operations for crossover and mutation are performed in each generation, and the search operation is completed when the number of alternations of generations exceeds a predetermined number (e.g., 5,000). Finally, the output unit 160 outputs at least one rule candidate as at least one rule when the degree of appropriateness (the multiple correlation coefficient) of each of the at least one rule candidate is high.

In addition, if all of the pixels in the selected positions are used as the variables of interest in the multiple regression analysis, the number of variables becomes too great. Therefore, processing for integration of the selected pixel positions is performed.

Next, a sequence of multiple regression analysis, including the processing for integration of evaluation positions performed by the integration unit 130, is explained below.

Figure 7:
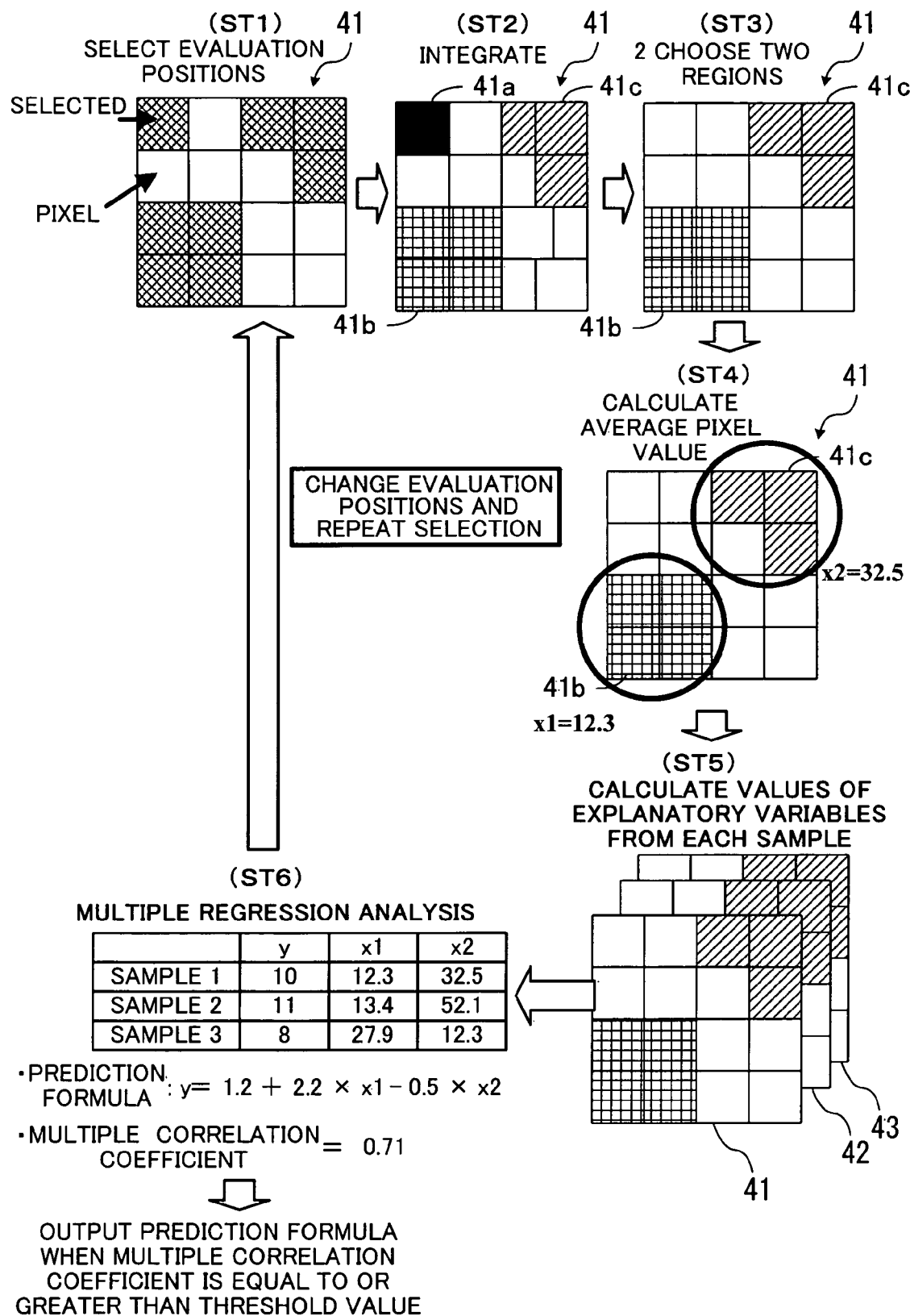
FIG. 7 is a diagram illustrating a sequence of processing in which integration of evaluation positions and multiple regression analysis are repeated.

FIG. 7 is a diagram illustrating a sequence of processing in which integration of evaluation positions and multiple regression analysis are repeated. For simplicity of explanation, in the example of FIG. 7, it is assumed that sample data are constituted by three temperature-distribution images 41, 42, and 43, each of which is constituted by 4×4 pixels.

In the first state (ST1), the evaluation positions in the temperature-distribution image 41 are selected as illustrated in FIG. 7, where selected pixels are indicated by crosshatched squares, and nonselected pixels are indicated by blank squares.

Subsequently, the processing for integration of evaluation positions is performed, so that the second state (ST2) illustrated in FIG. 7 is realized. In the example of FIG. 7, the integration is performed in such a manner that adjacent pixels are represented by a value of a single variable. Specifically, the value of each of the predetermined variables which represents values (of brightness) of the pixels integrated by the integration unit 130 is an average of the values of the pixels. Since the evaluation positions are integrated in the above manner, the number of the variables used in the evaluation can be reduced in comparison with the case where variables each representing the value of one of the 4×4 pixels are used in evaluation. In the example of FIG. 7, the evaluation positions in the first state (ST1) are integrated into the three evaluation regions 41a, 41b, and 41c in the second state (ST2).

Further, it is possible to set an upper limit of the number of the evaluation regions. In this case, only the evaluation regions the number of which does not exceed the upper limit are used in the processing. At this time, the evaluation regions containing greater numbers of pixels are preferentially used in the processing. In the example of FIG. 7, the upper limit of the number of the evaluation regions is assumed to be two. Therefore, only the evaluation regions 41b and 41c containing the greater numbers of pixels are chosen for use in the processing, and the evaluation region 41a corresponding to the smaller number of pixels is excluded, as illustrated as the third state (ST3) in FIG. 7.

Thus, the values of the variables corresponding to the chosen evaluation regions 41b and 41c are calculated. In this example, the averages of the brightness values of the pixels in the evaluation regions 41b and 41c are obtained as the values of the explanatory variables x1 and x2, respectively, as illustrated as the fourth state (ST4) in FIG. 7. That is, x1=12.3 and x2=32.5.

The operations of determination of evaluation regions and calculation of the values of explanatory variables are also performed on the other temperature-distribution images 42 and 43, and thus the values of the explanatory variables are obtained as illustrated as the fifth state (ST5) in FIG. 7. Subsequently, the rule-candidate generation unit 140 performs multiple regression analysis based on the values of the explanatory variables obtained from the temperature-distribution images 41, 42, and 43, and obtains results as illustrated as the sixth state (ST6) in FIG. 7.

In this example, the prediction formula, y=a+b×x1+c×x2, is obtained by the multiple regression analysis based on the values of the variables x1 and x2 and the value of the objective variable y which are obtained for the respective sample data items in the fifth state (ST5), where a, b, and c are real numbers. That is, the prediction formula expresses a straight line in a k-dimensional space, where k is the sum of the number of the objective variable and the number of the explanatory variables. The prediction formula is a formula for predicting a value of the objective variable y based on values of the explanatory variables x1 and x2. The values of the coefficients a, b, and c are calculated so that the errors in the value of the objective variable y are minimized when the values of the explanatory variables x1 and x2 obtained from the respective sample data items are substituted in the prediction formula.

It is possible to obtain the multiple correlation coefficient from the prediction formula. The multiple correlation coefficient is a numerical value indicating a degree of matching of the explanatory variables with the prediction formula. Greater absolute values of the multiple correlation coefficient indicate higher degrees of appropriateness of the prediction formula. Therefore, when the multiple correlation coefficient is equal to or greater than a predetermined threshold value, the prediction formula is outputted. Details of a method for deriving prediction formulas and multiple correlation coefficients are indicated, for example, by Takao Enkawa, "Tahenryo no Data Kaiseki (Multivariate Data Analysis)," published in Japanese by Asakura Shoten, Japan, pp. 22-43, 1988.

The processing for integration of evaluation positions and multiple regression analysis explained above are performed on a predetermined number of different individuals (different selection patterns formed of different combinations of evaluation positions) generated by the GA until the predetermined condition for completion of the search operation is satisfied.

The multiple regression analysis does not make sense when the number of explanatory variables is greater than the number of samples. However, in the case of image data, the number of pixels is generally greater than the number of samples, it is difficult to use the values of the pixels per se as explanatory variables. Therefore, the processing for integration is effective for making the number of explanatory variables smaller than the number of samples.

Hereinbelow, a sequence of processing for discovering a rule is explained with reference to a flow diagram.

Figure 8:
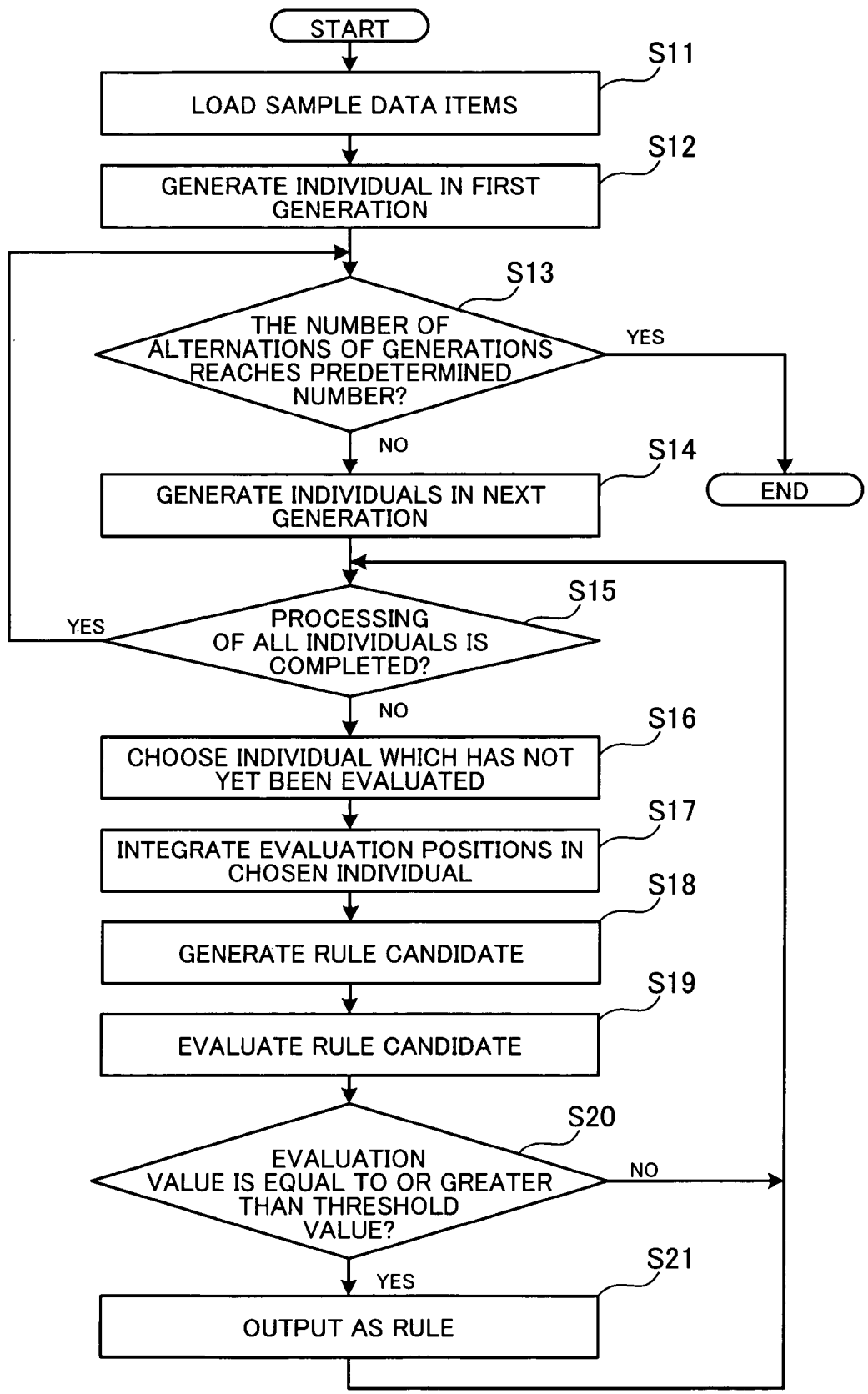
FIG. 8 is a flow diagram indicating a sequence of processing for generating a rule according to the first embodiment.

FIG. 8 is a flow diagram indicating a sequence of processing for generating a rule according to the first embodiment. The processing illustrated in FIG. 8 is explained below step by step.

<Step S11> The input reception unit 110 loads a plurality of sample data items, each of which is constituted by a pair of a temperature-distribution image and a text data item, where the temperature-distribution image representing a temperature distribution in a material poured in a mold for a chassis, and the text data item represents the strength of the chassis.

<Step S12> The search unit 120 generates an individual in the first generation for processing in accordance with a GA. Specifically, the search unit 120 selects for each individual at least one pixel from the pixels constituting each temperature-distribution image, and generates a predetermined number (e.g., 32) of individuals each of which has genes each indicating whether or not the corresponding pixel is selected.

<Step S13> The search unit 120 determines whether or not the number of alternations of generations reaches a predetermined number. When yes is determined, the processing of FIG. 8 is completed. When no is determined, the operation goes to step S14.

<Step S14> The search unit 120 generates a predetermined number of individuals in the next generation by using a GA.

<Step S15> The search unit 120 determines whether or not the evaluation of all of the generated individuals is completed. When yes is determined, the operation goes to step S13. When no is determined, the operation goes to step S16.

<Step S16> The integration unit 130 chooses an individual which has not yet been evaluated.

<Step S17> The integration unit 130 integrates adjacent evaluation positions in the chosen individual.

<Step S18> The rule-candidate generation unit 140 chooses a predetermined number (e.g., two) of evaluation regions each having a relatively large extent (being constituted by a greater number of pixels), from among evaluation regions generated by the integration, and generates a rule candidate indicating a relationship among the strength of the chassis and the values of the chosen evaluation regions, where the relationship is common to all of the sample data items.

Specifically, after the choice of the predetermined number of evaluation regions, the rule-candidate generation unit 140 obtains an average of the brightness values of the pixels in each of the chosen evaluation regions for each of the sample data items, and determines the obtained average to be the value, corresponding to the sample data item, of an explanatory variable. In addition, the rule-candidate generation unit 140 determines the value of the strength of the chassis contained in each sample data item to be the value, corresponding to the sample data item, of the objective variable. When the values of the explanatory variables and the objective variable for all of the sample data items are determined, the rule-candidate generation unit 140 performs multiple regression analysis based on the above values of the explanatory variables and the objective variable so as to generate a prediction formula, which constitutes the rule candidate.

<Step S19> The rule-candidate evaluation unit 150 evaluates the rule candidate generated by the rule-candidate generation unit 140. Specifically, the rule-candidate evaluation unit 150 calculates the multiple correlation coefficient of the prediction formula generated in step S18, as an evaluation value.

<Step S20> The output unit 160 determines whether or not the evaluation value (the multiple correlation coefficient) calculated by the rule-candidate evaluation unit 150 is equal to or greater than a predetermined threshold value. When yes is determined, the operation goes to step S21. When no is determined, the operation goes to step S15 for evaluation of another individual.

<Step S21> The output unit 160 outputs, as a feature extraction rule, the rule candidate and information indicating the extent of each of the chosen evaluation regions in the evaluated individual. The outputted feature extraction rule is stored in a storage device such as an HDD. Thereafter, the operation goes to step S15 for evaluation of another individual.

As described above, only one or more highly evaluated individuals are outputted, and information generated for each of the outputted individuals, such as the positions of the selected pixels at the time the corresponding rule is generated, is displayed on a screen which the rule discovery apparatus 100 has.

Figure 9:
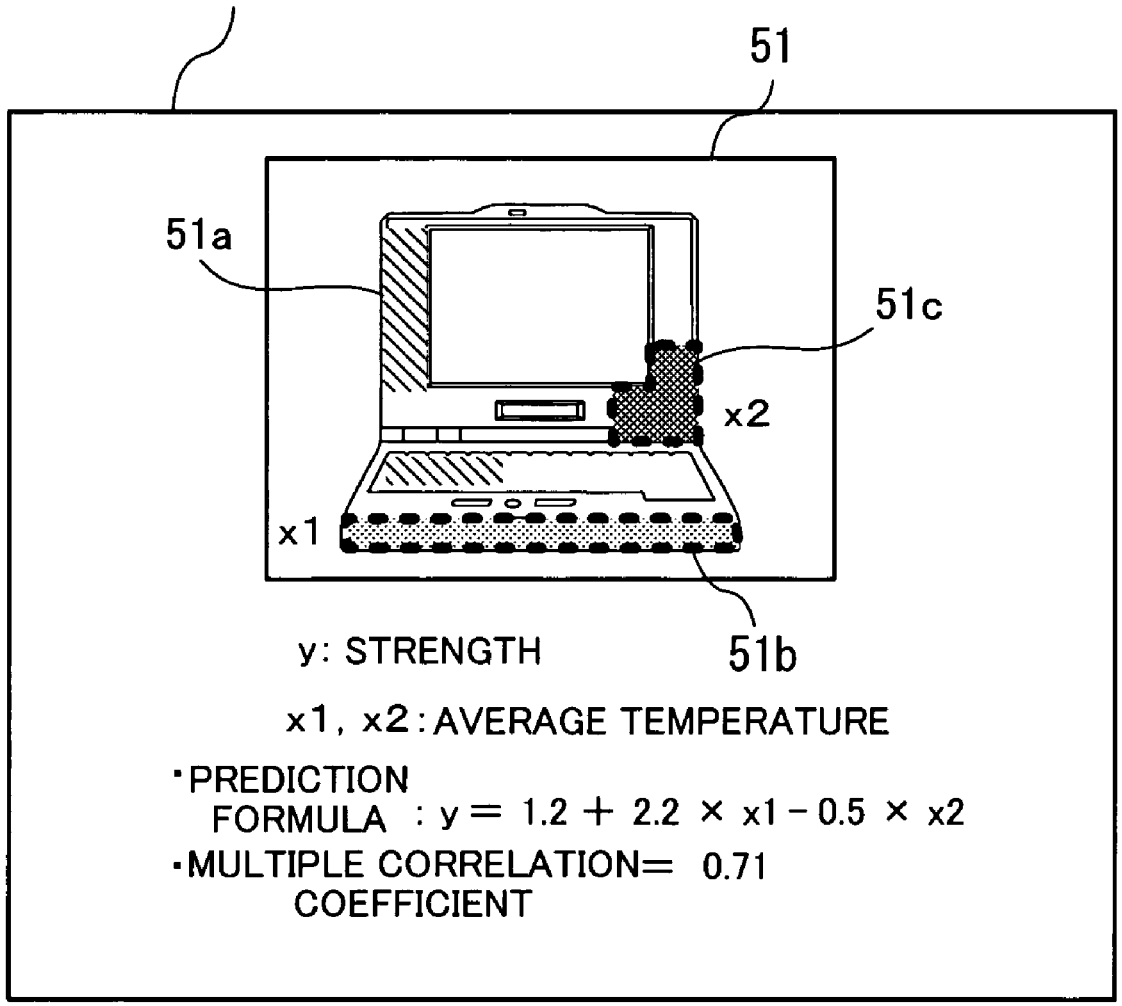
FIG. 9 is a diagram illustrating an example of a screen on which a rule is displayed.

FIG. 9 is a diagram illustrating an example of a screen on which a rule is displayed. In FIG. 9, a temperature-distribution image 51 is displayed on a rule-display screen 50. In the temperature-distribution image 51, the shape 51a of a PC chassis is indicated, and a temperature distribution in a material poured in a mold for the PC chassis is indicated by colors in the shape 51a of the PC chassis.

In addition, a prediction formula indicating a relationship between the temperature distribution and the strength of the chassis and a multiple correlation coefficient indicating the degree of reliability of the prediction formula are also displayed on the screen. Further, the regions 51b and 51c from which the values of the explanatory variables x1 and x2 for the prediction formula are obtained are indicated in the temperature-distribution image 51.

As explained above, since a rule can be automatically extracted from a plurality of pairs of multimedia data items and attribute data items, operators are not required to predetermine feature quantities, and therefore the labor cost can be reduced. In addition, the present invention is advantageous in that the automatically extracted rule does not depend on a personal point of view, and rules which are difficult to humanly discover can be extracted. Therefore, according to the present invention, it is possible to objectively and exhaustively discover rules, and effectively obtain rules with high quality.

Second Embodiment

Hereinbelow, the second embodiment of the present invention is explained. According to the second embodiment, adjacent evaluation positions are integrated only when the differences between the values of pixels at the adjacent evaluation positions are small.

The rule discovery apparatus according to the second embodiment has a similar construction to the rule discovery apparatus 100 according to the first embodiment illustrated in FIG. 1. However, some portions of the processing performed by the integration unit 130 and the rule-candidate generation unit 140 in the second embodiment are different from the first embodiment. Therefore, the following explanations are focused on the portions of the processing different from the first embodiment, and the same reference numerals as FIG. 5 are used.

Figure 10:
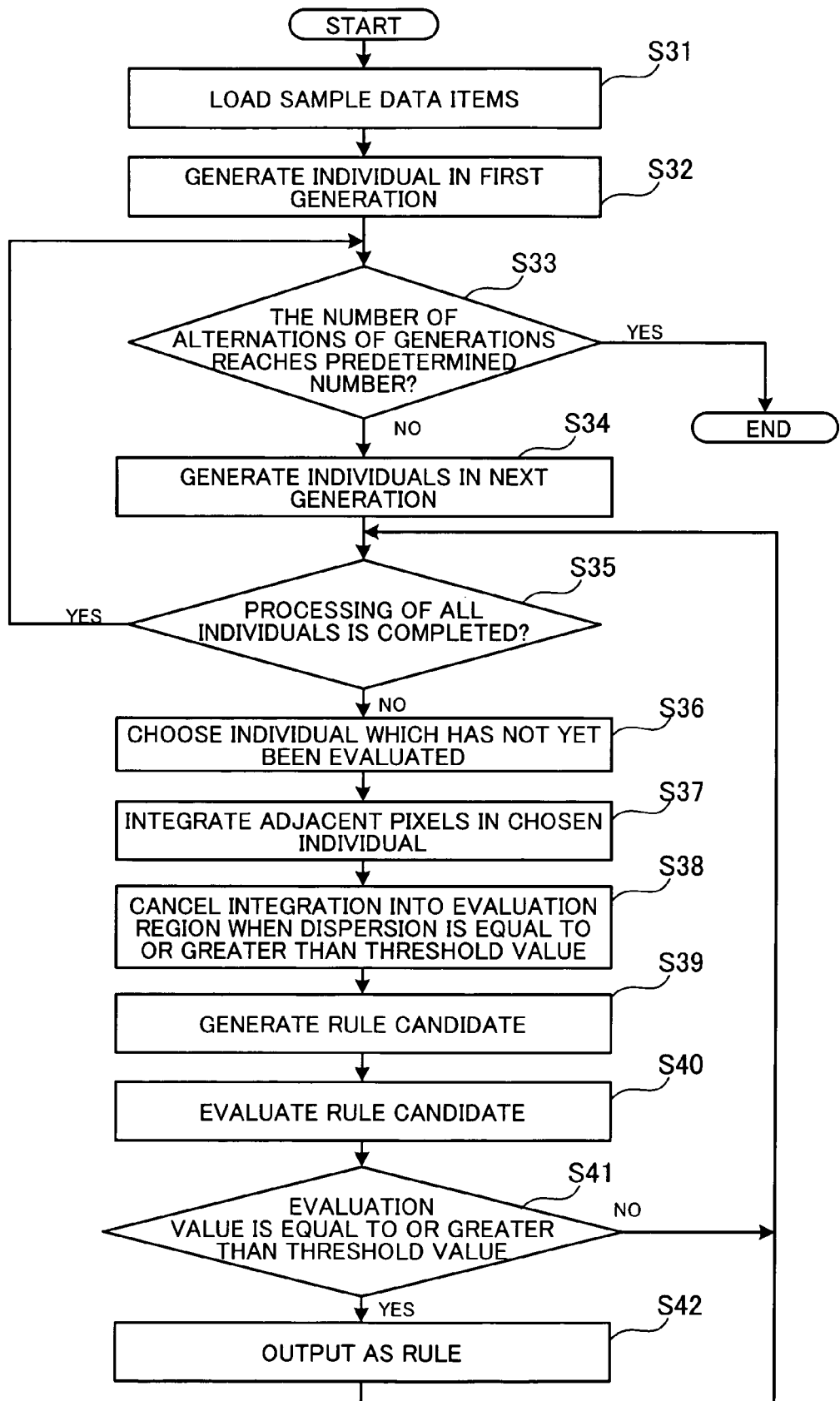
FIG. 10 is a flow diagram indicating a sequence of processing for generating a rule according to the second embodiment.

FIG. 10 is a flow diagram indicating a sequence of processing for generating a rule according to the second embodiment. The processing illustrated in FIG. 10 is explained below step by step.

The operations performed in steps S31 to S37 in FIG. 10 are respectively identical to the operations performed in steps S11 to S17 in FIG. 8, and the operations performed in steps S40 to S42 in FIG. 10 are respectively identical to the operations performed in steps S19 to S21 in FIG. 8. Therefore, only the operations in steps S38 and S39, which are different from the first embodiment, are explained below.

<Step S38> The integration unit 130 chooses one of the evaluation regions integrated in step S37, and then obtains the standard deviation of the values of pixels in the chosen evaluation region in the temperature-distribution image in each of the plurality of sample data items. Further, the integration unit 130 obtains an average value of the standard deviations in the chosen evaluation region over the plurality of sample data items.

Subsequently, the integration unit 130 chooses the remaining ones of the evaluation regions integrated in step S37 one by one, and obtains an average value of the standard deviations in the chosen evaluation region over the plurality of sample data items.

In addition, the integration unit 130 compares each average value of the standard deviations with a threshold value which is preset, and cancels the integration into the evaluation region corresponding to the average value when the average value is equal to or greater than the threshold value.

<Step S39> The rule-candidate generation unit 140 chooses a predetermined number (e.g., two) of evaluation regions each having a relatively large extent (being constituted by a greater number of pixels), from among evaluation regions generated by the integration which is not cancelled, and generates a rule candidate indicating a relationship among the strength of the chassis and the values of the chosen evaluation regions, where the relationship is common to all of the sample data items. Details of the processing for generating a rule candidate are identical to step S18 in the first embodiment.

As described above, it is possible to integrate only the evaluation positions in which the values of the pixels are not so much dispersed. Therefore, each evaluation region is generated from a group of pixels in a region in which the temperature does not greatly vary, and a value of an explanatory variable is calculated for the evaluation region. Thus, a feature related to the temperature of a region corresponding to each evaluation region in each temperature-distribution image can be accurately indicated by a value of an explanatory variable.

Specifically, the value of the explanatory variable is an average of the values of the pixels. Therefore, when the dispersion of the values of the pixels is great, the value of the explanatory variable cannot accurately indicate the feature related to the temperature of a region corresponding to the evaluation region in each temperature-distribution image. For example, when a first half of an evaluation region is a high temperature region and a second half of an evaluation region is a low temperature region, an averaged temperature value is obtained as the value of the explanatory variable representing the evaluation region. That is, the value of the explanatory variable does not represent the feature of the region corresponding to the evaluation region in each temperature-distribution image. Since, according to the second embodiment, the integration into each evaluation region in which the dispersion of the values of pixels is great is cancelled before generation of a rule candidate, the values of explanatory variables are obtained from only the evaluation regions in which the dispersion of the values of pixels is small. Therefore, it is possible to generate a rule candidate in which features of the temperature-distribution images are accurately reflected.

Third Embodiment

Hereinbelow, the third embodiment of the present invention is explained. According to the third embodiment, the search unit makes a coarse-to-fine search. That is, a coarse search for a solution is made first, and then a fine search for a solution is made over pixel combinations which are evaluated to satisfy a predetermined criterion based on the coarse search.

Specifically, first, in the coarse search, the minimum image elements constituting each image are assumed to be image elements each of which is constituted by a plurality of pixels instead of a single pixel. That is, the search unit selects, as the evaluation positions, positions of more than one of the above image elements each of which is constituted by a plurality of pixels, instead of positions of more than one pixel. For example, each of the above image elements is constituted by 5×5 pixels. The operations of the coarse search except for the minimum image elements are identical to the aforementioned operations of the search on a pixel-by-pixel basis. Thus, at least one solution (i.e., at least one rule candidate having an evaluation value equal to or greater than a predetermined value) is obtained by the coarse search.

Next, a fine search of selected image elements is made based on each rule candidate which is highly evaluated in the coarse search. The selected image elements are the image elements at the evaluation positions constituting at least one combination of image elements used in the rule candidate, and only the selected image elements are subject to the fine search. The fine search is made on a pixel-by-pixel basis. Thus, the solution obtained by the fine search is the final solution.

The rule discovery apparatus according to the third embodiment has a similar construction to the rule discovery apparatus 100 according to the first embodiment illustrated in FIG. 1. However, some portions of the processing performed by the search unit 120, the integration unit 130, and the rule-candidate generation unit 140 in the third embodiment are different from the first embodiment. Therefore, the following explanations are focused on the portions of the processing different from the first embodiment, and the same reference numerals as FIG. 5 are used.

Figure 11:
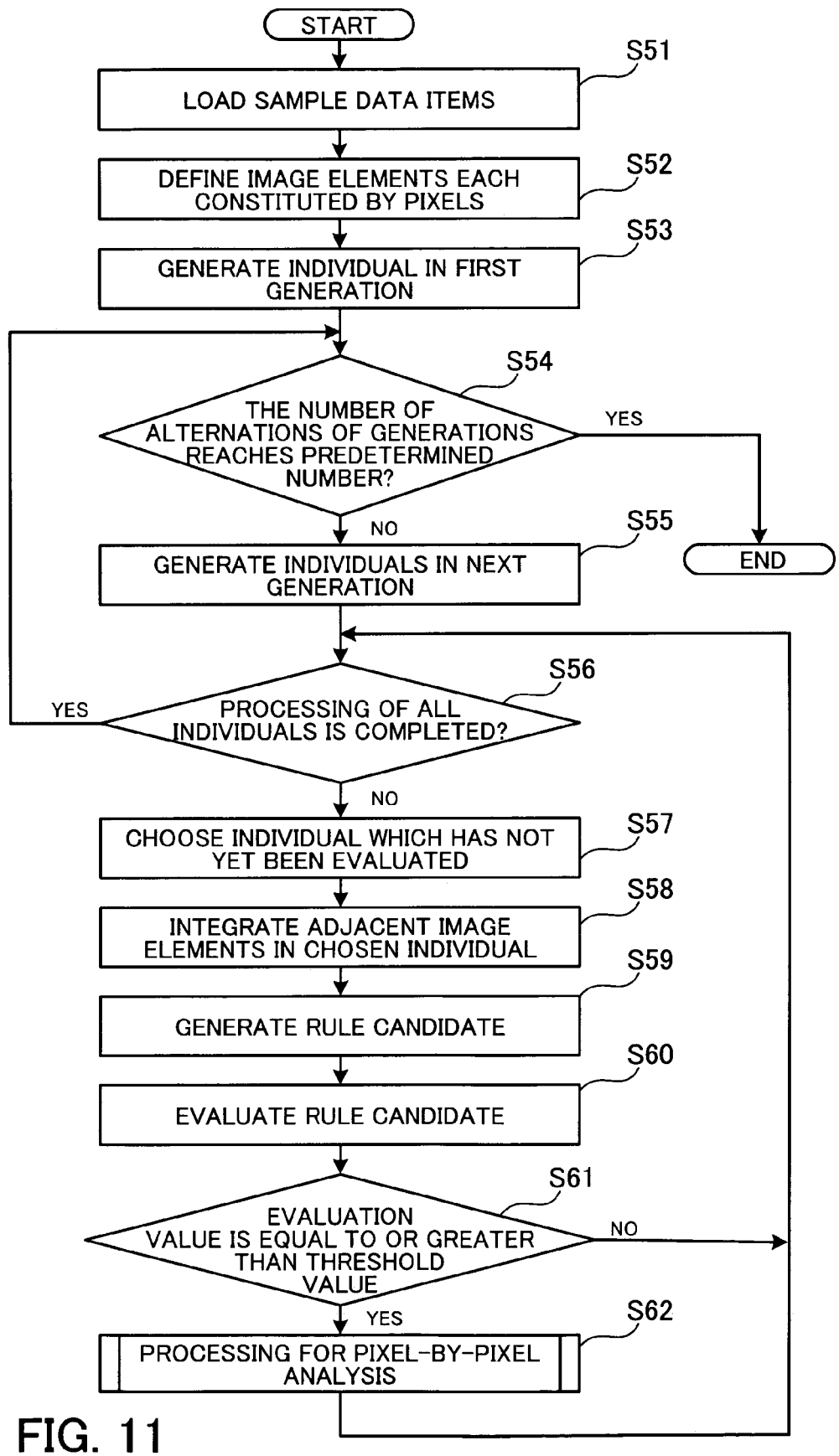
FIG. 11 is a flow diagram indicating a sequence of processing for generating a rule according to the third embodiment.

FIG. 11 is a flow diagram indicating a sequence of processing for generating a rule according to the third embodiment. The processing illustrated in FIG. 11 is explained below step by step.

<Step S51> The input reception unit 110 loads a plurality of sample data items, each of which is constituted by a pair of a temperature-distribution image and a text data item, where the temperature-distribution image representing a temperature distribution in a material poured in a mold for a chassis, and the text data item represents the strength of the chassis.

<Step S52> The search unit 120 defines a plurality of image elements each of which is constituted by a plurality of pixels. For example, each of the above image elements is constituted by 5×5 pixels.

<Step S53> The search unit 120 generates an individual in the first generation for processing in accordance with a GA. Specifically, the search unit 120 selects for each individual at least one image element from the image elements constituting each temperature-distribution image, and generates a predetermined number (e.g., 32) of individuals each of which has genes each indicating whether or not the corresponding image element is selected.

<Step S54> The search unit 120 determines whether or not the number of alternations of generations reaches a predetermined number. When yes is determined, the processing of FIG. 11 is completed. When no is determined, the operation goes to step S55.

<Step S55> The search unit 120 generates a predetermined number of individuals (as combinations of image elements) in the next generation by using a GA.

<Step S56> The search unit 120 determines whether or not the evaluation of all of the individuals generated in step S53 is completed. When yes is determined, the operation goes to step S54. When no is determined, the operation goes to step S57.

<Step S57> The integration unit 130 chooses an individual which has not yet been evaluated.

<Step S58> The integration unit 130 integrates adjacent evaluation positions in the chosen individual.

<Step S59> The rule-candidate generation unit 140 chooses a predetermined number (e.g., two) of evaluation regions each constituted by a greater number of image elements, from among evaluation regions generated by the integration, and generates a rule candidate indicating a relationship among the strength of the chassis and the values of the chosen evaluation regions, where the relationship is common to all of the sample data items.

<Step S60> The rule-candidate evaluation unit 150 evaluates the rule candidate generated by the rule-candidate generation unit 140. Specifically, the rule-candidate evaluation unit 150 calculates the multiple correlation coefficient of a prediction formula generated in step S59, as an evaluation value.

<Step S61> The search unit 120 determines whether or not the evaluation value (the multiple correlation coefficient) calculated by the rule-candidate evaluation unit 150 is equal to or greater than a predetermined threshold value. When yes is determined, the operation goes to step S62. When no is determined, the operation goes to step S56 for evaluation of another individual.

<Step S62> The search unit 120 designates the rule candidate and the set of the image elements selected in the individual evaluated as above to be subject to processing for pixel-by-pixel analysis, and starts the pixel-by-pixel analysis.

When the processing for pixel-by-pixel analysis is completed, the operation goes to step S56 for evaluation of another individual.

Figure 12:
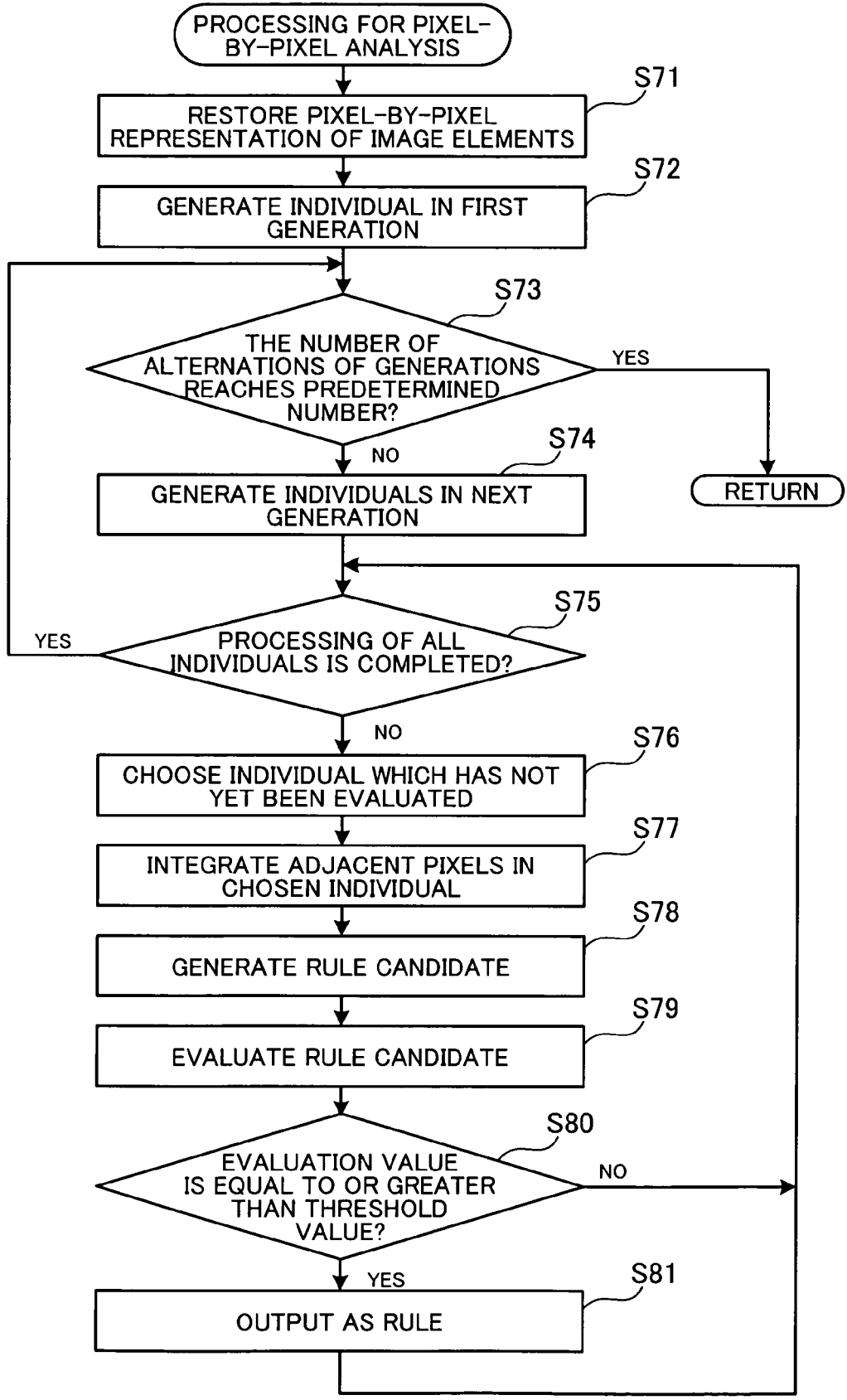
FIG. 12 is a flow diagram indicating a sequence of processing for pixel-by-pixel analysis.

FIG. 12 is a flow diagram indicating a sequence of the processing for pixel-by-pixel analysis. The processing illustrated in FIG. 12 is explained below step by step. In the processing illustrated in FIG. 12, each individual is generated on a pixel-by-pixel basis, and indicates whether or not each pixel is selected, i.e., a combination of selected pixels.

<Step S71> The search unit 120 restores the pixel-by-pixel representation of the image elements in the set designated in step S62. In the following processing in accordance with a GA, pixels are selected from among only the pixels in the image elements in the set designated in step S62.

<Step S72> The search unit 120 generates an individual in the first generation for processing in accordance with a GA. Specifically, the search unit 120 selects at least one pixel from the pixels in the above image elements in each temperature-distribution image, and generates a predetermined number (e.g., 32) of individuals each of which has genes each indicating whether or not each pixel is selected.

<Step S73> The search unit 120 determines whether or not the number of alternations of generations in the pixel-by-pixel analysis reaches a predetermined number. When yes is determined, the operation goes to step S56 in FIG. 11. When no is determined, the operation goes to step S74.

<Step S74> The search unit 120 generates a predetermined number of individuals in the next generation by using a GA.

<Step S75> The search unit 120 determines whether or not the evaluation of all of the generated individuals is completed. When yes is determined, the operation goes to step S73. When no is determined, the operation goes to step S76.

<Step S76> The integration unit 130 chooses an individual which has not yet been evaluated.

<Step S77> The integration unit 130 integrates adjacent evaluation positions in the chosen individual.

<Step S78> The rule-candidate generation unit 140 chooses a predetermined number (e.g., two) of evaluation regions each constituted by a greater number of pixels, from among evaluation regions generated by the integration in step S77, and generates a rule candidate indicating a relationship among the strength of the chassis and the values of the chosen evaluation regions, where the relationship is common to all of the sample data items.

<Step S79> The rule-candidate evaluation unit 150 evaluates the rule candidate generated by the rule-candidate generation unit 140. Specifically, the rule-candidate evaluation unit 150 calculates the multiple correlation coefficient of a prediction formula generated in step S78, as an evaluation value.

<Step S80> The output unit 160 determines whether or not the evaluation value (the multiple correlation coefficient) calculated by the rule-candidate evaluation unit 150 is equal to or greater than a predetermined threshold value. When yes is determined, the operation goes to step S81. When no is determined, the operation goes to step S75 for evaluation of another individual. The threshold value used in step S80 is higher than the threshold value used in step S61 in FIG. 11.

<Step S81> The output unit 160 outputs, as a feature extraction rule, the rule candidate and information indicating the extent of each of the chosen evaluation regions in the evaluated individual. The outputted feature extraction rule is stored in a storage device such as an HDD. Thereafter, the operation goes to step S75 for evaluation of another individual.

As described above, since a feature extraction rule can be obtained by combining a coarse search and a fine search according to the third embodiment, it is possible to increase the processing efficiency. For example, in the case where the original temperature-distribution images are high definition images, the number of possible combinations of selected pixels becomes extremely great, and therefore the amount of processing for obtaining a locally optimum solution from all of the possible combinations of selected pixels also becomes great. Since, according to the coarse-to-fine search, a coarse search for a solution is made first, and then a fine search for a solution is made over pixel combinations which are evaluated to satisfy a predetermined criterion based on the coarse search, a solution can be efficiently searched for.

Although, in the embodiments described above, a rule is obtained in the case where the multimedia data items are images, similar processing can be performed in the case where other types of multimedia data are handled. For example, in the case of sound data, it is possible to define data (e.g., data indicating the average intensity of sound) in each unit reproduction time span having a predetermined length, as a minimum data element which can be selected by the search unit 120. In this case, the integration unit 130 integrates selected data in successive unit reproduction time spans.

Although, in the embodiments described above, a rule is obtained in the case where the multimedia data items are two-dimensional images, it is possible to obtain a rule indicating a relationship between data of a three-dimensional model (such as volume data) and text data. In this case, for example, it is possible to divide a three-dimensional space into a plurality of cubes each having a predetermined size, and define data representing a portion of each three-dimensional image in each cube in accordance with a cubic model, as a minimum data element which can be selected by the search unit 120. In addition, the integration unit 130 integrates selected data corresponding to adjacent cubes which abut each other at a face.

The above processing functions can be realized by a computer. In this case, a program for the rule discovery apparatus 100 is provided. The program describes details of the processing functions which the rule discovery apparatus 100 should have. The processing functions of the rule discovery apparatus 100 are realized on a computer when the computer executes the above program.

The above program describing the details of processing can be stored in a computer-readable recording medium. The computer-readable recording medium may be a magnetic recording device, an optical disc, an optical magnetic recording medium, a semiconductor memory, or the like. The magnetic recording device may be a hard disk drive (HDD), a flexible disk (FD), a magnetic tape, or the like. The optical disc may be a DVD (Digital Versatile Disc), a DVD-RAM (Random Access Memory), a CD-ROM (Compact Disc Read Only Memory), a CD-R (Recordable)/RW (ReWritable), or the like. The optical magnetic recording medium may be an MO (Magneto-Optical Disc) or the like.

In order to put the program into the market, for example, it is possible to sell a portable recording medium such as a DVD or a CD-ROM in which the program is recorded. Alternatively, the above program can be stored in a storage device belonging to a server computer, and transferred from the server computer to the above computer through a network.

The computer which executes the above program stores the program in a storage device belonging to the computer, where the program is originally recorded in, for example, a portable recording medium, or transferred from the server computer. Then, the computer reads the program from the storage device, and performs processing in accordance with the program. Alternatively, the computer may directly read the program from the portable recording medium for performing processing in accordance with the program. Further, the computer can sequentially execute processing in accordance with each portion of the program when the portion of the program is transferred from the server computer.

As explained above, according to the present invention, a rule candidate is obtained by repeating generation of a selection pattern of evaluation positions and reduction of the number of feature data positions, and outputting as a rule a rule candidate satisfying a predetermined criterion, where the reduction of the number of feature data positions is realized by integrating evaluation positions in the selection pattern so as to generate evaluation regions. Therefore, even in the case where multimedia data constituted by an array of a great number of data elements are handled, it is possible to automatically select regions designated to be feature portions, and discover an accurate rule.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable storage medium storing a rule discovery program, said program, when executed on a computer, causing the computer to execute a process comprising:

receiving a plurality of sample data items which are each formed of a multimedia data item and a text data item distinctively associated with that multimedia data item;

selecting evaluation positions of a data array constituting each of said multimedia data items in said sample data items, wherein the evaluation positions are positions at which evaluation is to be made;

integrating said selected evaluation positions into a plurality of evaluation regions which are to be evaluated;

calculating, for each of the plurality of sample data items, numerical values representing a feature of data in the individual evaluation regions;

generating a prediction formula by analyzing correlation of the text data items included in the plurality of sample data items with the calculated numerical values representing the feature of data in the individual evaluation regions of the received multimedia data items, the prediction formula predicting, from data in the plurality of evaluation regions of a given multimedia data item, a single text data item that represents a feature of the given multimedia data item as a whole;

evaluating accuracy of said prediction formula by using the received sample data items so as to obtain an evaluation result; and outputting said prediction formula as a rule that indicates relationships between the multimedia data items and text data items, when said evaluation result satisfies a predetermined criterion;

wherein said selecting evaluation positions, said integrating selected evaluation positions, said calculating numerical values, said generating a prediction formula, said evaluating accuracy, and said outputting are repeated with a different combination of evaluation positions of said data array until a predetermined condition for completion is satisfied, and wherein said integrating forms the plurality of evaluation regions facing each other across one or more positions of the data array other than said selection evaluation positions of the data array by integrating adjacent ones of said selected evaluation positions of the data array as a candidate region for said evaluating by representing adjacent pixels using a value of a single variable, calculates a degree of dispersion of values of data elements in the integrated adjacent evaluation positions in each of the evaluation regions using the single variable, and cancels integration of the evaluation positions when the degree of dispersion is greater than a predetermined value.

2. The non-transitory computer-readable storage medium according to claim 1, wherein said evaluating accuracy evaluates said prediction formula by multiple regression analysis.

3. The non-transitory computer-readable storage medium according to claim 1, wherein said selecting evaluation positions generates at least one first selection pattern by preferentially extracting at least one second selection pattern corresponding to at least one highly evaluated prediction formula from among selection patterns which are previously generated, based on evaluation results of rule candidates generated in correspondence with the selection patterns, and changing a combination of evaluation positions in each of the at least one second selection pattern.

4. The non-transitory computer-readable storage medium according to claim 3, wherein said selecting evaluation positions generates said at least one first selection pattern in accordance with a genetic algorithm.

5. The non-transitory computer-readable storage medium according to claim 1, wherein said selecting evaluation positions divides data positions on said data array into unit areas each containing a plurality of data positions, and selects ones of the unit areas as evaluation positions.

6. The non-transitory computer-readable storage medium according to claim 5, wherein after said ones of the unit areas are selected, said selecting evaluation positions selects, as the evaluation positions, data positions in ones of the unit areas being selected and corresponding to rule candidates evaluated to satisfy a predetermined criterion.

7. The non-transitory computer-readable storage medium according to claim 1, wherein said generating a prediction formula chooses a predetermined number of evaluation regions, from among the evaluation regions generated by said integrating, and generates said prediction formula based on a relationship among feature data in the predetermined number of evaluation regions and the text data items.

8. The non-transitory computer-readable storage medium according to claim 7, wherein said predetermined number of evaluation regions are evaluation regions in each of which an extent of selected evaluation positions is relatively great, among the evaluation regions generated by said integrating.

9. A rule discovery process executed by a computer, the process comprising:

receiving a plurality of sample data items each formed of a multimedia data item and a text data item distinctively associated with that multimedia data item;

selecting evaluation positions of a data array constituting each of said multimedia data items in said sample data items, wherein the evaluation positions are positions at which evaluation is to be made;

integrating said selected evaluation positions into a plurality of evaluation regions which are to be evaluated;

calculating, for each of the plurality of sample data items, numerical values representing a feature of data in the individual evaluation regions;

generating a prediction formula by analyzing correlation of the text data items included in the plurality of sample data items with the calculated numerical values representing the feature of data in the individual evaluation regions of the received multimedia data items, the prediction formula predicting, from data in the plurality of evaluation regions of a given multimedia data item, a single text data item that represents a feature of the given multimedia data item as a whole;

evaluating accuracy of said prediction formula so as to obtain an evaluation result; and outputting said prediction formula as a rule that indicates relationships between the multimedia data items and text data items, when said evaluation result satisfies a predetermined criterion;

wherein said selecting evaluation positions, said integrating selected evaluation positions, said calculating numerical values, said generating a prediction formula, said evaluating accuracy, and said outputting are repeated with a different combination of evaluation positions of said data array until a predetermined condition for completion is satisfied, and wherein said integrating forms the plurality of evaluation regions facing each other across one or more positions of the data array other than said selection evaluation positions of the data array by integrating adjacent ones of said selected evaluation positions of the data array as a candidate region for said evaluating by representing adjacent pixels using a value of a single variable, calculates a degree of dispersion of values of data elements in the integrated adjacent evaluation positions in each of the evaluation regions using the single variable, and cancels integration of the evaluation positions when the degree of dispersion is greater than a predetermined value.

10. A rule discovery apparatus comprising:

a processor executing:

an input reception unit which receives a plurality of sample data items each formed of a multimedia data item and a text data item distinctively associated with that multimedia data item;

a search unit which selects evaluation positions of a data array constituting each of said multimedia data items;

an integration unit which integrates said selected evaluation positions into a plurality of evaluation regions which are to be evaluated;

a prediction formula generation unit which calculates, for each of the plurality of sample data items, numerical values representing a feature of data in the individual evaluation regions, and generates a prediction formula by analyzing correlation of the text data items included in the plurality of sample data items with the calculated numerical values representing the feature of data in the individual evaluation regions of the received multimedia data items, the prediction formula predicting, from data in the plurality of evaluation regions of a given multimedia data item, a single text data item that represents a feature of the given multimedia data item as a whole;

a prediction formula evaluation unit which evaluates accuracy of said prediction formula so as to obtain an evaluation result;

an output unit which outputs said prediction formula whose evaluation result satisfies a predetermined criterion, as a rule that indicates relationships between the multimedia data items and text data items; and a display unit which displays the rule on a display screen;

wherein the operations of said search unit, said integration unit, said prediction formula generation unit, said prediction formula evaluation unit, and said output unit are repeated with a different combination of evaluation positions of said data array until a predetermined condition for completion is satisfied, and wherein said integration unit forms the plurality of evaluation regions facing each other across one or more positions of the data array other than said selection evaluation positions of the data array by integrating adjacent ones of said selected evaluation positions of the data array as a candidate region for said evaluating by representing adjacent pixels using a value of a single variable, calculates a degree of dispersion of values of data elements in the integrated adjacent evaluation positions in each of the evaluation regions using the single variable, and cancels integration of the evaluation positions when the degree of dispersion is greater than a predetermined value.

\* \* \* \* \*